US012012209B2

(12) United States Patent
Benedik et al.

(10) Patent No.: US 12,012,209 B2
(45) Date of Patent: Jun. 18, 2024

(54) WATER SCOOPING APPARATUS FOR AN AIRCRAFT AND AN AIRCRAFT COMPRISING THE SAME

(71) Applicant: SCODEV INTERNATIONAL B.V., Beek (NL)

(72) Inventors: Jacobus Gerardus Hendrikus Maria Benedik, Beek (NL); Stefano Brizzolara, Blacksburg, VA (US)

(73) Assignee: SCODEV INTERNATIONAL B.V., CS Beek (NL)

( * ) Notice: Subject to any disclaimer, the term of this patent is extended or adjusted under 35 U.S.C. 154(b) by 453 days.

(21) Appl. No.: 17/440,317

(22) PCT Filed: Apr. 16, 2020

(86) PCT No.: PCT/EP2020/060730
§ 371 (c)(1),
(2) Date: Sep. 17, 2021

(87) PCT Pub. No.: WO2020/212504
PCT Pub. Date: Oct. 22, 2020

(65) Prior Publication Data
US 2022/0144434 A1 May 12, 2022

(30) Foreign Application Priority Data
Apr. 17, 2019 (NL) .................. 2022960

(51) Int. Cl.
*B64D 1/22* (2006.01)
*A62C 3/02* (2006.01)
*B64D 1/16* (2006.01)
(52) U.S. Cl.
CPC .............. *B64D 1/22* (2013.01); *A62C 3/0242* (2013.01); *B64D 1/16* (2013.01); *Y10T 137/6906* (2015.04)

(58) Field of Classification Search
CPC .......... B64D 1/22; B64D 1/16; A62C 3/0242; Y10T 137/6906
See application file for complete search history.

(56) References Cited

U.S. PATENT DOCUMENTS 3,759,330 A * 9/1973 Rainey ..................... B64D 1/16
169/53
3,897,829 A * 8/1975 Eason ....................... B64D 1/16
169/53
(Continued)

FOREIGN PATENT DOCUMENTS

EP 3245131 11/2017
FR 1481100 5/1967
(Continued)

OTHER PUBLICATIONS

International Search Report issued in PCT/EP2020/060730 dated Jul. 15, 2020.

*Primary Examiner* — Daphne M Barry
*Assistant Examiner* — Frederick D Soski
(74) *Attorney, Agent, or Firm* — Workman Nydegger

(57) ABSTRACT

The invention relates to a water scooping apparatus (2) for an aircraft (1), comprising a water scooping unit (7) that is associated with a water tank (10) via an extendible tubular member (5). The water scooping unit being provided with an intake opening (20) that is in fluidic communication with the extendible tubular member and arranged at a side of the water scooping unit facing away from the sky when the water scooping apparatus is in an active state, the water scooping unit (7) being provided with a plurality of surface-piercing hydrofoils (25, 26, 27, 28) arranged surrounding the intake opening (20) and configured to generate an upward force when being moved through a body of water to position (Continued)

the water scooping unit with respect to a surface (9) of the body of water in such a way to ensure water intake via the intake opening.

17 Claims, 14 Drawing Sheets

(56) References Cited

U.S. PATENT DOCUMENTS

| | | | | |
|---|---|---|---|---|
| 4,090,567 | A * | 5/1978 | Tomlinson | B64D 1/16 169/53 |
| 5,549,259 | A * | 8/1996 | Herlik | B64D 1/16 244/121 |
| 6,003,782 | A * | 12/1999 | Kim | B64D 47/08 239/428 |
| 6,644,595 | B2 * | 11/2003 | Ramage | A62C 3/0228 169/53 |
| 6,688,402 | B1 * | 2/2004 | Wise | B64D 1/22 169/44 |
| 6,874,734 | B2 * | 4/2005 | Ramage | A62C 3/0228 169/53 |
| 9,957,047 | B2 * | 5/2018 | Benedik | B64D 1/16 |
| 10,406,390 | B2 * | 9/2019 | Zimmerman | A62C 5/022 |
| 11,008,101 | B2 * | 5/2021 | Miller | B64F 3/00 |
| 2001/0054669 | A1 * | 12/2001 | Ramage | A62C 3/0228 244/136 |
| 2005/0045770 | A1 * | 3/2005 | Ramage | A62C 3/0228 244/136 |
| 2010/0178176 | A1 * | 7/2010 | Kenyon | B64D 1/22 169/53 |
| 2011/0168414 | A1 * | 7/2011 | Nelson | B64D 1/16 169/53 |
| 2018/0002019 | A1 * | 1/2018 | Benedik | B64D 1/16 |
| 2020/0130833 | A1 * | 4/2020 | Miller | B66D 1/60 |
| 2022/0364541 | A1 * | 11/2022 | Afonja | F03B 13/142 |

FOREIGN PATENT DOCUMENTS

| | | | |
|---|---|---|---|
| FR | 2512775 | 3/1983 | |
| GB | 2163710 A * | 3/1986 | B64D 1/22 |
| WO | WO0169058 | 9/2001 | |
| WO | WO2018165699 | 9/2018 | |

\* cited by examiner

WATER SCOOPING APPARATUS FOR AN AIRCRAFT AND AN AIRCRAFT COMPRISING THE SAME

FIELD OF THE INVENTION

The present invention relates to a water scooping apparatus for a conventional aircraft that can be used to extinguish forest fires or wildfires, to an aircraft equipped with such a water scooping apparatus and to a method of filling water tanks on board of such an aircraft.

BACKGROUND OF THE INVENTION

Aircrafts that can be used to extinguish fires are known in the art. Examples of such aircrafts are amphibious Canadair forest fire fighters. These so-called "Canadair" aircrafts are dedicated to fighting forest fires or wildfires and search and rescue in case of disaster on sea, due to the ability to land on a surface of a body of water. These aircrafts enable to fill the installed water tanks while flying over a body of water with the hull of the aircraft skimming the surface of the body of water. They can for example fill the water tanks with about 6000 liters of water in 12 seconds. To the water taken in additives can be added such as foam forming compounds or gel to form a liquid fire suppressant. The additives improve the fire suppressing action. After taking in water, the aircraft can take off, fly to the forest fire and drop the content of the water tanks on or near the burning area while flying at low altitude.

By repeating this maneuver, the forest fire or wildfire can be extinguished. A tactical way of firefighting is to spread a wide path or blanket of liquid fire suppressant i.e. water in front of a forest fire by means of multiple droppings, blocking the way for the forest fire to spread out in the direction of the wind.

A disadvantage of such aircrafts is, that they are dedicated to this activity and can only be used for extinguishing fires and rescues on high sea. Furthermore, they need to contact the water, and usually have only a limited capacity of about 6000 liters of water to release above a fire.

Conventional, non-amphibious aircrafts which contain water tanks, so-called airtankers, may have a larger storage capacity, about 10.000-30.000 liters, but they are not equipped to pick up water from the surfaces of bodies of water such as seas, lakes or rivers. They generally need to land at an airport, refill the water tanks and take off again. This takes a large amount of time and only one run and drop of liquid fire suppressant can be achieved per hour. In addition, the fuel cost is higher, and an efficient method of extinguishing forest fires expressed in terms of total cost per liter per hour cannot be reached.

In the art, for example as described in British patent GB 2163710, an aircraft is known which is equipped with an apparatus for scooping up water. The described aircraft has a boom pivoted at its forward end to the underside of the aircraft's fuselage and having at its rear end a scoop connected via a duct in the boom to a water storage tank mounted in the fuselage. When the aircraft is flying closely above the surface of a body of water, the boom may be lowered to dip the scoop into the water to thereby refill the tank. The scoop can be equipped with a hydrofoil to guide the scoop through the surface of the body of water. Such scoop and hydrofoil however have an undefined position with respect to the surface of the body of water and may exhibit uncontrolled downward movement when pulled through the surface of a body of water, thereby endangering the aircraft to be pulled down.

The abovementioned disadvantage can be mitigated with a water scooping apparatus known from European patent application EP 3 245 131 A1 or from International patent application WO 2018/165699 A1. The water scooping apparatus according to EP 3 245 131 A1 enables an improved way of taking in water into an aircraft that is provided with water tanks. The water scoop according to WO 2018/165699 A1 enables an improved way of taking in water by providing a hydrofoil that is located adjacent the water inlet of the water scoop. However, an improved vertical stability of the floater or water scoop when it is in contact with the body of water would be desirable.

SUMMARY OF THE INVENTION

It is an object of the present invention to provide a water scooping apparatus that pre-empts or at least reduces the abovementioned disadvantages associated with the water scooping apparatuses known in the art.

It is also an object of the present invention to provide an aircraft that is provided with a water tank and a water scooping apparatus according to the invention.

It is yet another object of the present invention to provide a method for filling at least one water tank of the aircraft using the water scooping apparatus according to the invention.

Aspects of the present invention are set out in the accompanying independent and dependent claims. Features from the independent and dependent claims may be combined as appropriate and not merely as explicitly set out in the claims. Furthermore, all features may be replaced with other technically equivalent features.

At least one of the abovementioned objects is achieved by a water scooping apparatus for an aircraft, comprising an extendible tubular member having a first end and an opposite end, wherein the first end is pivotally attachable to an aircraft, the extendible tubular member being substantially retracted when the water scooping device is in an inactive state and being arranged to extend downwards from the aircraft at an angle when the water scooping device is in an active state, a duct that is arranged to fluidly connect a water tank to the extendible tubular member at its first end, a water scooping unit that is fluidly connected to the opposite end of the extendible tubular member, the water scooping unit being provided with an intake opening that is in fluidic communication with the extendible tubular member and that is arranged at a side of the water scooping unit that faces away from the sky when the water scooping apparatus is in the active state, the water scooping unit being provided with a plurality of surface-piercing hydrofoils, the surface-piercing hydrofoils of said plurality of surface-piercing hydrofoils being arranged surrounding the intake opening in such a way that as seen in a direction parallel to a longitudinal centerline of the water scooping unit a first pair of surface-piercing hydrofoils is arranged upstream of the intake opening and a second pair of surface-piercing hydrofoils is arranged downstream of the intake opening, the surface-piercing hydrofoils of each of the first pair of surface-piercing hydrofoils and the second pair of surface-piercing hydrofoils being configured to generate an upward force when being moved through a body of water when the water scooping apparatus is in the active state to position the water scooping unit with respect to a surface of the body of water in such a way to ensure water intake via the intake opening.

The extendible tubular member enables the water scooping apparatus to be operable in either an inactive state or in an active state. The inactive state is to be construed as the state in which the extendible tubular member is in a retracted state either inside or underneath the aircraft that is provided with the water scooping apparatus according to the invention. Moreover, in the inactive state, the water scooping unit of the water scooping apparatus is in a resting position in which the water scooping unit is not in contact with the body of water. The active state is to be construed as the state in which the extendible tubular member is in an extended state and at an angle with respect to a longitudinal central axis of a fuselage of the aircraft. In the active state, the water scooping unit of the water scooping apparatus is either descending towards the surface of the body of water or moving through the body of water to scoop water via the intake opening.

It is noted that the term 'at an angle' is to be understood so as to mean that the extendible tubular member is oblique with respect to the longitudinal central axis of the fuselage of the aircraft. The angle between the extendible tubular member and the longitudinal central axis of the fuselage is preferably 20 to 70 degrees, more preferably 40 to 45 degrees.

The first end of the extendible tubular member is pivotally attachable to an aircraft via a pivotal connection such as for example a hinge. The pivotal attachment of the extendible tubular member to the aircraft allows the aircraft to fly at variable altitudes relative to a surface of a body of water. The pivotability of the extendible tubular member with respect to the aircraft allows an optimal angle to be assumed between the extendible tubular member and the aircraft for pulling the water scooping unit at a given altitude of the aircraft. For example, a body of water having high waves may require the aircraft to fly at a higher altitude than in the case of a body of water having low waves.

Once being moved through the body of water, e.g. a sea, a lake, a river, the surface-piercing hydrofoils of the plurality of surface-piercing hydrofoils that are arranged surrounding the intake opening of the water scooping unit in the way described above, provide an upward force to position the water scooping unit with respect to a surface of the body of water in such a way to ensure water intake via the intake opening, i.e. the water scooping unit is positioned with respect to the surface of the body of water such that the intake opening is located at a well-defined position in the water, preferably at a working depth below the surface. Because of the application of the surface-piercing hydrofoils the water scooping unit itself does not need to have buoyancy to keep the water scooping unit floating on the body of water. As a result, the water scooping unit can have a more compact design compared to a situation in which the water scooping unit needs to have buoyancy.

The surface-piercing hydrofoils of said plurality of surface-piercing hydrofoils are configured and arranged to achieve an improved vertical stability of the water scooping unit when positioned on the body of water compared to a situation in which the water scooping unit is in direct contact with the body of water. In addition, the application of the surface-piercing hydrofoils enables the resistance between the water scooping unit and the water to be lower compared to the situation in which the water scooping unit is in direct contact with the water while moving through it. Moreover, the surface-piercing hydrofoils can be configured and arranged to prevent the water scooping unit from ending up at a position too deep below the surface of the body of water as a result of which the aircraft could be pulled down.

In an exemplary embodiment of the water scooping apparatus, the plurality of surface-piercing hydrofoils comprises at least four surface-piercing hydrofoils or at least two pairs of surface-piercing hydrofoils. However, the person skilled in the art will appreciate that the plurality of surface-piercing hydrofoils can comprise any number of surface-piercing hydrofoils that can achieve the abovementioned advantageous effects.

In a specific exemplary embodiment of the water scooping apparatus the plurality of surface-piercing hydrofoils comprises four surface-piercing hydrofoils that can be arranged as four individual surface-piercing hydrofoils or as two pairs of two interconnected surface-piercing hydrofoils that are arranged surrounding the intake opening to achieve the abovementioned effects.

The water scooping apparatus can be installed underneath an aircraft, which can be a conventional non-amphibious aircraft, with the intention to scoop water from any suitable body of water, for example a sea, a lake or a river, in order to suppress forest fires and/or wildfires. The water scooping apparatus can for example also be installed inside a conventional aircraft, provided it has an access door or hatch in the fuselage from where the water scooping apparatus can be deployed outside the aircraft to skim the surface of the body of water and to scoop water.

The water scooping apparatus can be installed permanently or can be installed just for the duration of a high-risk season regarding forest-fires and/or wildfires. It allows a conventional non-amphibious aircraft to scoop water from a suitable body of water when flying at an altitude between 1-18 meters above the surface of the body of water, preferably at an altitude between 5-15 meters above the surface of the body of water.

The water scooping apparatus can be installed in different types of aircrafts. For example, in small aircrafts known as Single Engine Air Tankers (SEATs) or Air Tractors (e.g. AT-802) which are normally used for crop spraying, in medium-size airtankers such as a Neptune P-2H, or in Large Air Tankers (LATs) such as the Hercules C-130, and in Very Large Airtankers (VLATs) such as a DC 10.

In an embodiment of the water scooping apparatus according to the invention, the plurality of surface-piercing hydrofoils comprises at least one of surface-piercing hydrofoils having a leg-shape, surface-piercing hydrofoils having an arc-shape, and surface-piercing hydrofoils having a ladder-shape.

The leg-shaped surface-piercing hydrofoils can advantageously be used in the event that hardly any or at most modest waves are present at the surface of the body of water. A leg-shaped surface-piercing hydrofoil in accordance with a first exemplary embodiment thereof can have a foot section at its free end part. The foot section can be provided to the free end part of the leg-shaped surface-piercing hydrofoil as a detachable component or can be integrated with the leg-shaped surface-piercing hydrofoil so as to be an integrated part of the leg-shaped surface-piercing hydrofoil. In any event, the foot section is configured to further improve the stability with which the water scooping unit of the water scooping apparatus can be positioned relative to the surface of the body of water. The foot section can have a free end portion that is a bent portion having a free tip that is pointing towards the sky when the leg-shaped surface-piercing hydrofoil is in contact with the body of water.

A leg-shaped surface-piercing hydrofoil in accordance with a second exemplary embodiment thereof can have a free end portion having a tip that is directed facing away from the sky when the leg-shaped surface-piercing hydrofoil is in contact with the body of water.

The person skilled in the art will appreciate that the leg-shaped surface-piercing hydrofoils in accordance with the first exemplary embodiment or the second exemplary embodiment can be configured in any suitable way to improve the stability with which the water scooping unit of the water scooping apparatus can be positioned relative to the surface of the body of water at which the at most modest waves are present.

The arc-shaped surface-piercing hydrofoils can advantageously be used in the event that modest to high waves are present at the surface of the body of water. An arc-shaped surface-piercing hydrofoil in accordance with a first exemplary embodiment thereof can have a C-shaped cross-section. The opening of the C-shaped cross-section is facing away from the sky when the arc-shaped surface-piercing hydrofoil is in contact with the body of water.

In accordance with a second exemplary embodiment of the arc-shaped surface-piercing hydrofoils a reinforcement rib can be applied. In this case, the arc-shaped surface-piercing hydrofoils have a D-shaped cross-section. The reinforcement rib of the D-shaped cross-section is facing away from the sky when the arc-shaped surface-piercing hydrofoil is in contact with the body of water.

The person skilled in the art will appreciate that the arc-shaped surface-piercing hydrofoils in accordance with the first exemplary embodiment or the second exemplary embodiment can be configured in any suitable way to improve the stability with which the water scooping unit of the water scooping apparatus can be positioned relative to the surface of the body of water at which the modest to high waves are present.

The ladder-shaped surface-piercing hydrofoils can advantageously be used in the event that modest to very high waves are present at the surface of the body of water. Under such medium to severe weather conditions, the ladder-shaped surface-piercing hydrofoils can achieve an even further improved stability with which the water scooping unit of the water scooping apparatus can be positioned relative to the surface of the body of water when compared to the improved stability that can be achieved by using the arc-shaped surface-piercing hydrofoils. Moreover, the ladder-shaped surface-piercing hydrofoils can still achieve stable positioning of the water scooping unit of the water scooping apparatus relative to the surface of the body of water in such severe weather conditions in which the arc-shaped surface-piercing hydrofoils fail.

The person skilled in the art will appreciate that the ladder-shaped surface-piercing hydrofoils in accordance with the present invention can be configured and arranged in any convenient and suitable way to achieve an improved stability with which the water scooping unit of the water scooping apparatus can be positioned relative to the surface of the body of water at which the modest to high waves are present.

The person skilled in the art will appreciate that depending of the weather conditions any suitable combination of leg-shaped and arc-shaped surface-piercing hydrofoils and any suitable number of leg-shaped and/or arc-shaped surface-piercing hydrofoils can be applied in order to achieve the abovementioned advantageous effects.

In an embodiment of the water scooping apparatus according to the invention, the water scooping unit comprising a bow and a stern. The water scooping unit can have a V-shaped body, like for example the body of a speedboat with a sharp bow and a stern. Such a V-shape can enable even smoother landing of the water scooping unit on the surface of the body of water and maintain a steady course of the water scooping unit through the water at a speed that is sufficient for the aircraft to remain airborne. The sharp bow can for example be axe shaped.

In an embodiment of the water scooping apparatus according to the invention, the intake opening is arranged facing the bow. In this way, water can be scooped via the intake opening using the forward thrust of the aircraft to which the water scooping apparatus is attached.

In an embodiment of the water scooping apparatus according to the invention, the intake opening is provided with an intake valve. This prevents water after being taken in via the intake opening to flow back out via the intake opening when the water scooping unit of the water scooping apparatus is lifted from the surface of the body of water.

In an embodiment of the water scooping apparatus according to the invention, the water scooping unit is provided with an airfoil that is arranged at a side of the water scooping unit that faces away from the surface of the body of water when the water scooping apparatus is in the active state, the airfoil being configured to have an angle of engagement with air that is chosen to create a downward force during descent of the water scooping unit towards the surface of the body of water when the water scooping apparatus is in the active state. The airfoil that can for example be mounted near the stern of the water scooping unit, forces the water scooping unit to descend towards the surface of the body of water and stabilizes the water scooping unit while being airborne.

In accordance with a first exemplary embodiment of the airfoil, the airfoil is collapsible towards the water scooping unit via a collapsible support structure that is associated with the water scooping unit. While the water scooping unit is airborne above the surface of the body of water the airfoil is deployed, whereas when the water scooping unit is in contact with the body of water, the airfoil is collapsed towards the water scooping unit via the collapsible support structure to prevent damage from for example waves that are present at the surface of the body of water. The collapsible support structure can be configured to enable setting of the angle of engagement with air. This can be advantageous depending on the weather conditions.

In accordance with a second exemplary embodiment of the airfoil, the airfoil comprises two wings that are associated with each other and arranged at an angle with respect to each other that is suitable to create said downward force during descent of the water scooping unit towards the surface of the body of water while ensuring stabilization of the water scooping unit while being airborne.

In an embodiment of the water scooping apparatus according to the invention, the water scooping unit is provided with a hydrofoil that is arranged at the side of the water scooping unit that faces away from the sky when the water scooping apparatus is in the active state, the hydrofoil being configured to have an angle of engagement with water that is chosen to create a downward force to allow the intake opening to take in water when the water scooping apparatus is in the active state. In this way, the hydrofoil ensures that the intake opening stays fully submerged when the water scooping unit is positioned with respect to the surface of the body of water by the surface-piercing hydrofoils. As a result, the highest volume of water in the shortest period of time with the lowest forces on the aircraft can be taken in and transferred to at least one water tank associated with the aircraft. The hydrofoil can be configured to enable setting of the angle of engagement with water. This can be advantageous depending on the weather conditions.

In an embodiment of the water scooping apparatus according to the invention, the hydrofoil is arranged near the stern. In this way, the hydrofoil prevents the bow of the water scooping unit from diving below the surface of the body of water. Moreover, when the water scooping unit is pulled through the water by the aircraft, the downward force resulting from the interaction between the hydrofoil and the water pulls the water scooping unit down into the water. This pulling down of the water scooping unit is balanced by the upward force generated by the interaction between the surface-piercing hydrofoils and the water while the water scooping unit is pulled through the water. By mounting the hydrofoil near the stern, the downward force may also compensate for a torque that results from the resistance between the intake opening and the water through which the water scooping unit is moved and that pushes the bow of the water scooping unit down. Therefore, an equilibrium position of the water scooping unit with respect to the surface of the body of water can be reached in a passive way, i.e. as a result of the counteracting forces on the water scooping unit of the water scooping apparatus a stable and safe scooping position of the water scooping unit relative to the surface of the body of water can be obtained. Because of this equilibrium position of the water scooping unit relative to the surface of the body of water, the water scooping unit is prevented from moving too deep into the body of water, thereby mitigating the risk of the aircraft to be pulled down by the water scooping unit.

In an embodiment of the water scooping apparatus according to the invention, the extendible tubular member comprises an extendible pipe having at least one extension pipe. The extendible tubular member can have extension means for driving the at least one extension pipe. The extendible pipe can be pivotally attached to the aircraft via a hinge that is configured and arranged to enable the pivoting action required to extend the pipe downwards with an angle relative to the aircraft. The pipe can be provided with extension means such as rods to extend mechanically. The pipe can also be extended hydraulically. A drive or hydraulic pump can allow the extending of the pipe.

In an embodiment of the water scooping apparatus according to the invention, the extendible pipe is a telescopic pipe. The telescopic pipe can have multiple segments. This allows the extendible pipe to be housed in a space within the aircraft fuselage.

In an embodiment of the water scooping apparatus according to the invention, the extendible tubular member comprises at least one hose, and the water scooping apparatus further comprises means for releasing and retracting the at least one hose. By releasing and retracting the at least one hose, the at least one hose can extend from the aircraft and be retracted after use. The flexibility of the at least one hose provides the hinge action allowing the hose to extend from the aircraft and assume an angle relative to the aircraft. The at least one hose can be made from a reinforced material comprising for example Dyneema™ fiber or a similar material.

In an embodiment of the water scooping apparatus according to the invention, the means for releasing and retracting of the at least one hose comprises a reel that is configured and arranged to roll the at least one hose onto the reel and to unroll the at least one hose from the reel. The rolling onto the reel or the unrolling from the reel of the at least one hose provides the hinge action allowing the hose to extend from the aircraft and assume an angle relative to the aircraft. Moreover, the main axle of the reel can freely rotate and allow the aircraft to fly at different altitudes, preferably between 5 and 15 meters.

By rolling up the at least one hose onto the reel provides a space saving solution for storing the water scooping apparatus. The reel with the at least one hose can be accommodated inside the aircraft fuselage in a compartment for example underneath a loading floor. The compartment can be covered with a door or hatch. Thus, when the scooping device is not in use, the aircraft can fly without air resistance due to parts extending outside the fuselage.

In an embodiment of the water scooping apparatus according to the invention, the water scooping apparatus comprises positioning means that are configured and arranged to position the extendible tubular member to allow the water scooping unit to be movable in and out of a resting position when the water scooping apparatus is switched between the inactive state and the active state. When the water scooping apparatus is switched between to the inactive state and the active state, the positioning means position the extendible tubular member in such a way to prevent the water scooping unit from colliding with the fuselage of the aircraft when it is moved in and out of the resting position. In this way, the positioning means enables the so-called launch and capture of the water scooping unit when the water scooping apparatus is switched between the inactive state and the active state. Moreover, the positioning means allows the extendible tubular member to be manufactured from relatively light material wherein the mechanical force to position the extendible tubular member and the water scooping unit by lifting them is relieved by means of the positioning means.

In an embodiment of the water scooping apparatus according to the invention, the surface-piercing hydrofoils of said first pair of surface-piercing hydrofoils are arranged at opposite sides of the intake opening as seen in a direction transverse to the longitudinal centerline of the water scooping unit, and the surface-piercing hydrofoils of said second pair of surface-piercing hydrofoils are arranged at opposite sides of the intake opening as seen in said direction transverse to the longitudinal centerline of the water scooping unit.

In an embodiment of the water scooping apparatus according to the invention, the surface-piercing hydrofoils of said first pair of surface-piercing hydrofoils are arranged to extend symmetrically with respect to the longitudinal centerline of the water scooping unit as seen in said direction transverse to the longitudinal centerline of the water scooping unit, and the surface-piercing hydrofoils of said second pair of surface-piercing hydrofoils are arranged to extend symmetrically with respect to the longitudinal centerline of the water scooping unit as seen in said direction transverse to the longitudinal centerline of the water scooping unit.

According to another aspect of the present invention, an aircraft is provided comprising a fuselage that is provided with a water tank, the aircraft further being provided with a water scooping apparatus according to the invention, the water scooping apparatus being pivotally associated with the aircraft, wherein the water scooping apparatus is in fluid communication with the water tank via the duct. The person skilled in the art will appreciate that the water scooping unit of the water scooping apparatus can be installed underneath any aircraft, including conventional non-amphibious aircrafts, to provide the ability to scoop water from a sea, a lake or a river or from any other body of water to suppress forest fires and/or wildfires. The pivotal association of the water scooping apparatus and the aircraft can be established by a pivotal connection such as for example a hinge that can be mounted underneath the aircraft and connected directly to a frame or skeleton of the aircraft, wherein the frame or skeleton has been reinforced for this purpose.

According to yet another aspect of the present invention, a method is provided for filling at least one water tank of an aircraft according to the invention, the method comprising flying over a surface of a body of water at an altitude in a range of 1-18 meter, extending the extendible tubular member until the water scooping unit of the water scooping apparatus is brought into contact with the surface of the body of water, and taking in water from the body of water via the intake opening of the water scooping unit.

Depending on the actual weather conditions, the altitude at which the aircraft flies over the surface of the body of water is preferably in a range of 5-15 meters. After filling the at least one water tanks with water, the extendible tubular member can be retracted and moved into the resting position and the water scooping apparatus can be switched to the inactive state. When the water scooping unit of the water scooping apparatus is in the resting position and the water scooping apparatus is in the inactive state, the water scooping apparatus underneath the aircraft can be covered by a hatch.

BRIEF DESCRIPTION OF THE DRAWINGS

Further features and advantages of the invention will become apparent from the description of the invention by way of exemplary and non-limiting embodiments of a water scooping apparatus and an aircraft comprising such a water scooping apparatus.

The person skilled in the art will appreciate that the described embodiments of the water scooping apparatus and the aircraft are exemplary in nature only and not to be construed as limiting the scope of protection in any way. The person skilled in the art will realize that alternatives and equivalent embodiments of the water scooping apparatus and the aircraft can be conceived and reduced to practice without departing from the scope of protection of the present invention.

Reference will be made to the figures on the accompanying drawing sheets. The figures are schematic in nature and therefore not necessarily drawn to scale. Furthermore, equal reference numerals denote equal or similar parts. On the attached drawing sheets.

DETAILED DESCRIPTION OF EMBODIMENTS

Figure 1:
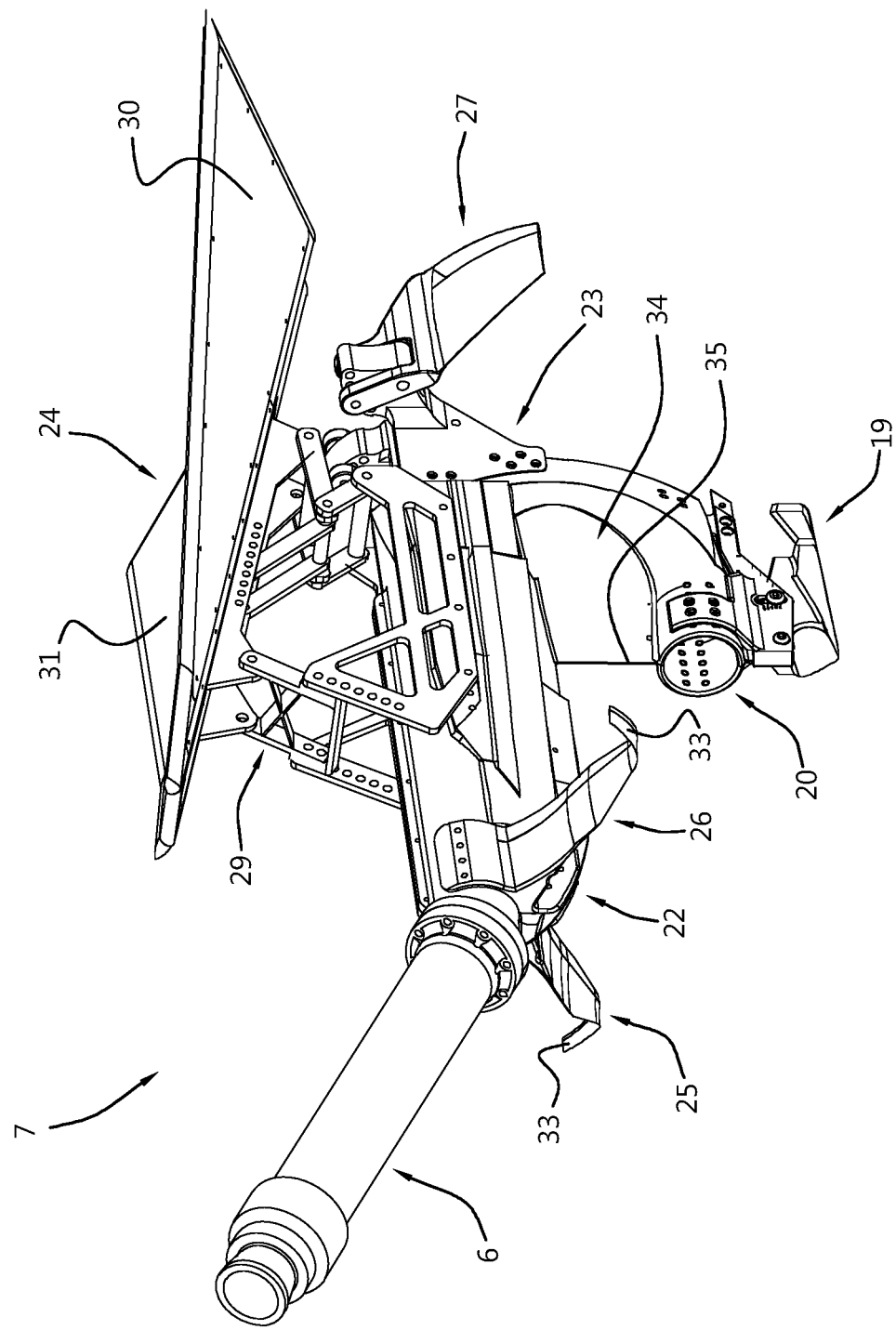
FIG. 1 shows a schematic isometric view of a first exemplary, non-limiting embodiment of a water scooping unit of a water scooping apparatus according to the invention.
Figure 2:
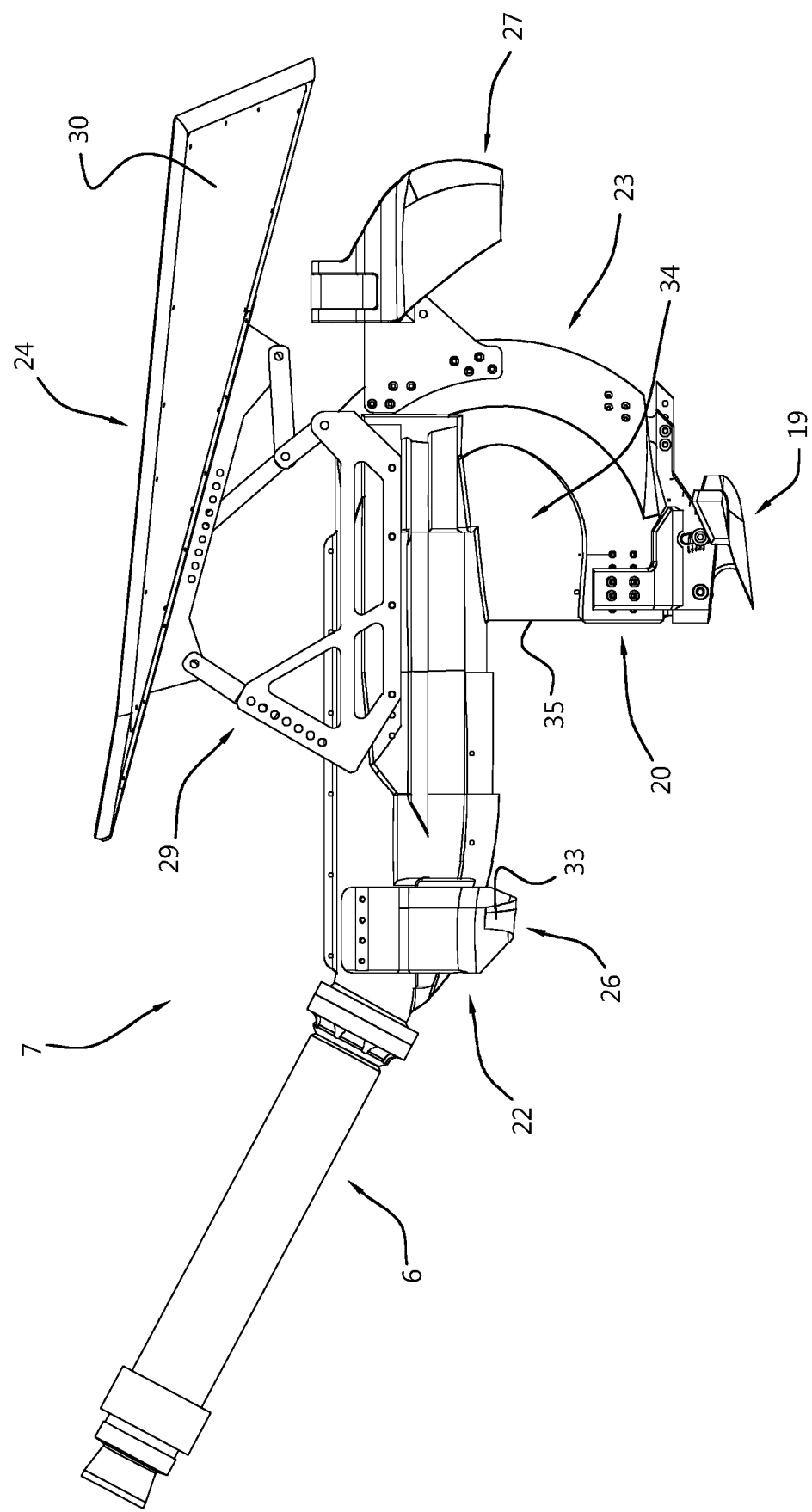
FIG. 2 shows a schematic side view of the first exemplary, non-limiting embodiment of the water scooping unit of the water scooping apparatus shown in FIG. 1.
Figure 3:
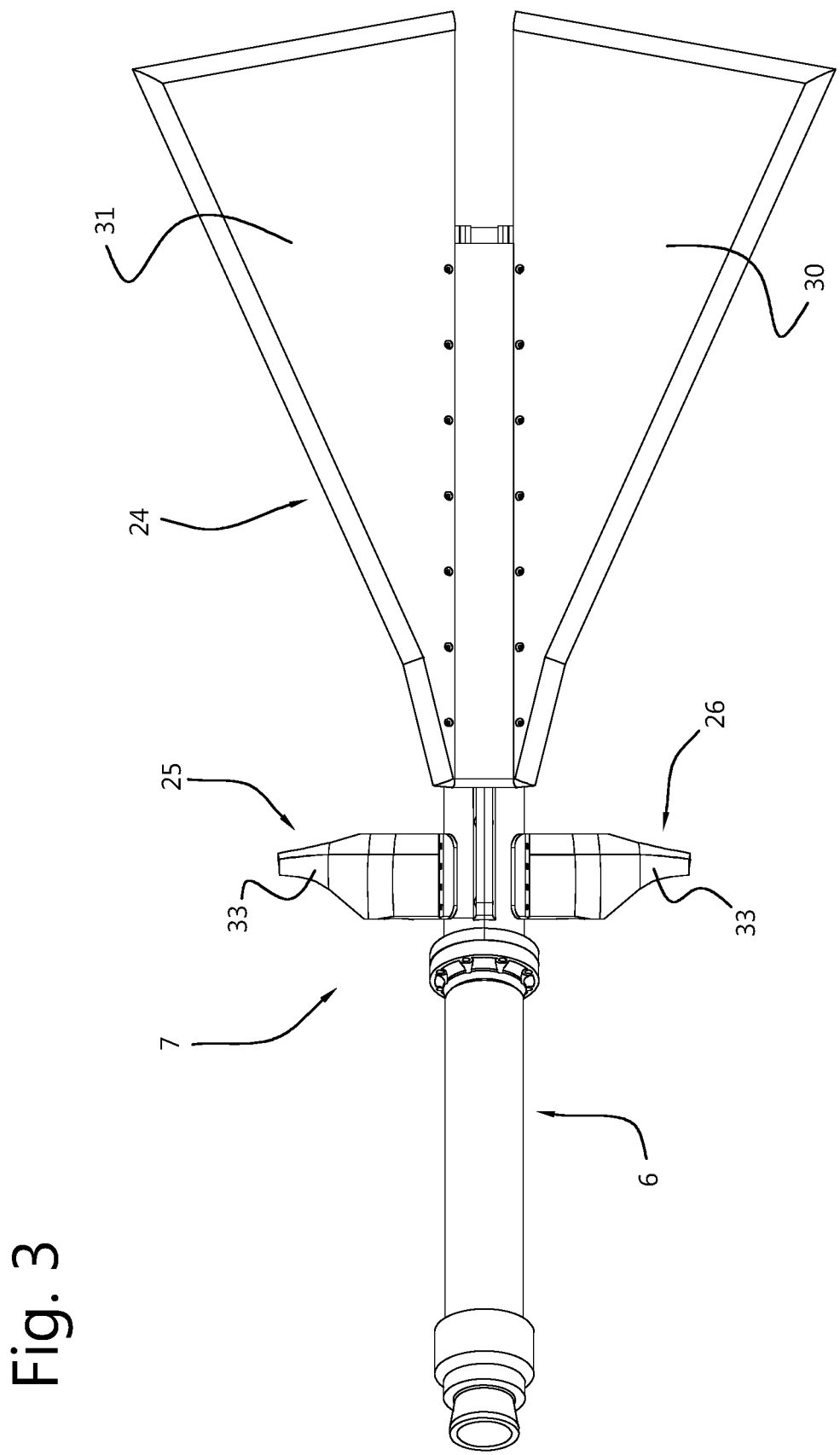
FIG. 3 shows a schematic top view of the first exemplary, non-limiting embodiment of the water scooping unit of the water scooping apparatus shown in FIGS. 1 and 2.
Figure 4:
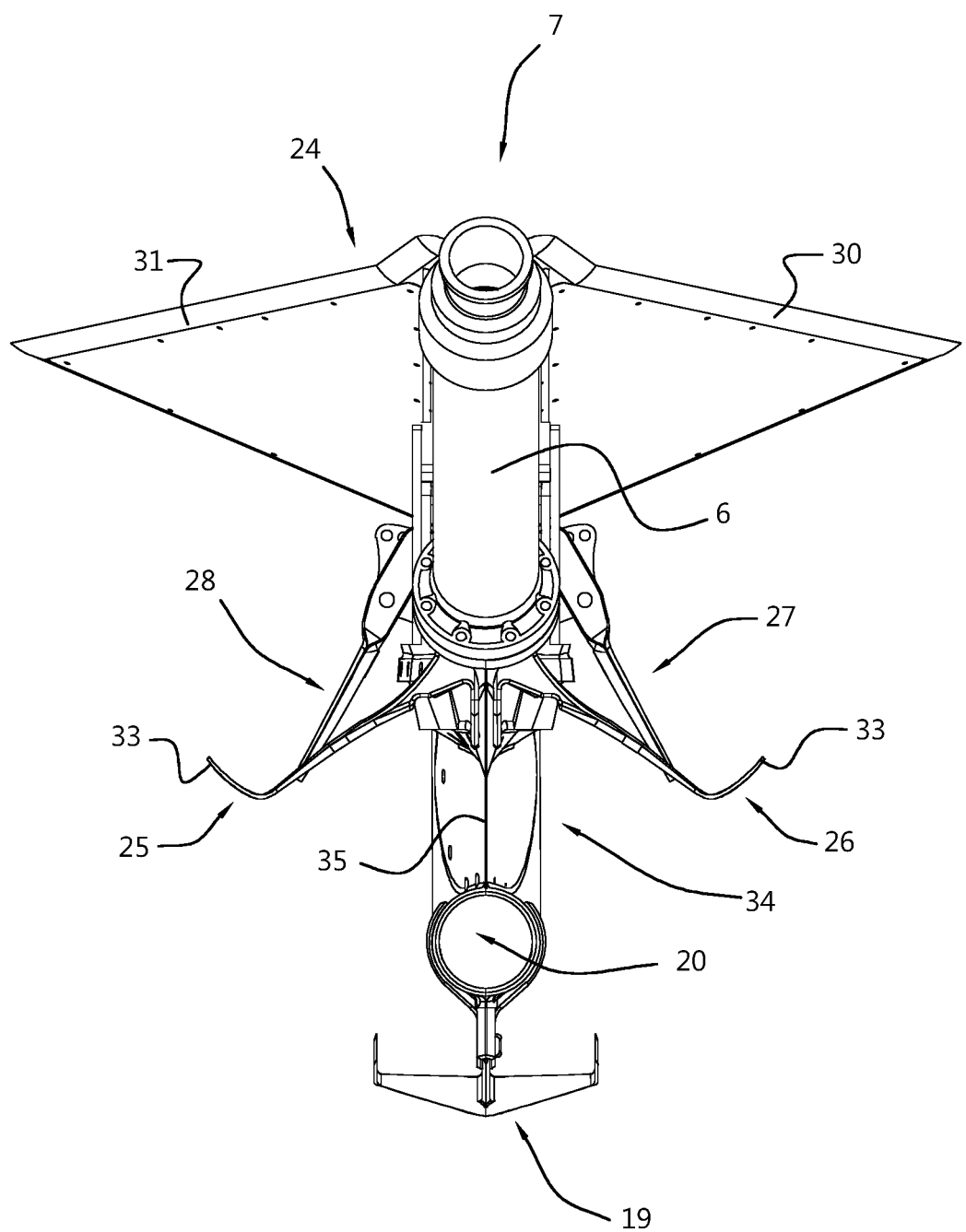
FIG. 4 shows a schematic front view of the first exemplary, non-limiting embodiment of the water scooping unit of the water scooping apparatus shown in FIGS. 1-3.

FIGS. 1-4 show different schematic views of a first exemplary, non-limiting embodiment of a water scooping unit 7 of a water scooping apparatus according to the invention. FIG. 1 shows a schematic isometric view of the first exemplary, non-limiting embodiment of the water scooping unit 7. FIG. 2 shows a schematic side view of the water scooping unit 7 shown in FIG. 1. FIG. 3 shows a schematic top view of the water scooping unit 7 shown in FIGS. 1 and 2. FIG. 4 shows a schematic front view of the water scooping unit 7 shown in FIGS. 1-3.

The water scooping unit 7 shown in FIGS. 1-4 is provided with four surface-piercing hydrofoils 25, 26, 27, 28 that are arranged surrounding an intake opening 20 of the water scooping unit 7 that is arranged at a side of the water scooping unit 7 that faces away from the sky when the water scooping apparatus is in the active state and configured to take in water from a body of water with which the water scooping unit 7 is in contact when the water scooping apparatus is in the active state. The active state and the inactive state of the water scooping apparatus will be described in further detail in relation to FIGS. 9-11.

The four surface-piercing hydrofoils are arranged surrounding the intake opening 20 in such a way that as seen in a direction parallel to a longitudinal centerline of the water scooping unit 7 a first pair of surface-piercing hydrofoils 25, 26 is arranged upstream of the intake opening 20 and a second pair of surface-piercing hydrofoils 27, 28 is arranged downstream of the intake opening 20. The four surface-piercing hydrofoils 25, 26, 27, 28 are configured and arranged to provide an upward force to position the water scooping unit 7 with respect to a surface of a body of water through which the water scooping unit 7 is moved when the water scooping apparatus is in the active state. The surface-piercing hydrofoils 25, 26, 27, 28 enable positioning of the water scooping unit 7 with respect to the surface of the body of water in such a way to ensure water intake via the intake opening 20, i.e. the water scooping unit 7 is positioned with respect to the surface of the body of water such that the intake opening 20 is located at a well-defined position in the water, preferably at a working depth below the surface. Because of the application of the surface-piercing hydrofoils 25, 26, 27, 28 the water scooping unit 7 itself does not need to have buoyancy to keep the water scooping unit 7 floating on the body of water. As a result, the water scooping unit 7 can have a more compact design compared to a situation in which the water scooping unit 7 needs to have buoyancy.

The plurality of surface-piercing hydrofoils shown in FIGS. 1-8 comprises an exemplary and non-limiting number of four surface-piercing hydrofoils 25, 26, 27, 28 that are configured and arranged to achieve an improved vertical stability of the water scooping unit 7 when positioned on the body of water compared to a situation in which the water scooping unit 7 itself needs to have buoyance in order to keep floating at a suitable position with respect to the surface of the body of water. In addition, the application of the surface-piercing hydrofoils 25, 26, 27, 28 enables the water scooping unit 7 to move through the body of water experiencing less resistance compared to the situation in which the water scooping unit 7 is not provided with surface-piercing hydrofoils and has to have buoyancy to keep floating at a suitable position with respect to the surface of the body of water through which it is being moved. Moreover, the surface-piercing hydrofoils 25, 26, 27, 28 can be configured and arranged to prevent the water scooping unit 7 from ending up at a position too deep below the surface of the body of water as a result of which an aircraft that is using the water scooping apparatus to scoop up water could be pulled down.

As mentioned above, the number of four surface-piercing hydrofoils is exemplary only and non-limiting in any way as the person skilled in the art will appreciate that any number of surface-piercing hydrofoils that are arranged surrounding the intake opening 20 to achieve the abovementioned advantages effects can be used.

As shown in FIGS. 1-4 regarding the first exemplary, non-limiting embodiment of the water scooping unit 7 and in FIGS. 5-8 regarding the second exemplary, non-limiting embodiment of the water scooping unit 7, the water scooping unit 7 has a bow 22 and a stern 23. The four surface-piercing hydrofoils 25, 26, 27, 28 shown in FIGS. 1-4 are leg-shaped. Leg-shaped surface-piercing hydrofoils can advantageously be used in the event that hardly any or at most modest waves are present at the surface of the body of water with which the water scooping unit 7 is in contact.

As shown in FIGS. 1-4, each of the leg-shaped surface-piercing hydrofoils 25, 26 that are arranged nearest to the bow 22 have a foot section 33 at their respective free end parts. The foot sections 33 can either be provided to the free end parts of the leg-shaped surface-piercing hydrofoils 25, 26 as detachable components or be integrated with the leg-shaped surface-piercing hydrofoils so as to be integrated parts thereof. In any event, the foot sections 33 are configured to further improve the stability with which the water scooping unit 7 can be positioned relative to the surface of the body of water. The foot sections 33 shown in FIGS. 1-4 have a free end portion that is a bent portion having a free tip that is pointing towards the sky when the leg-shaped surface-piercing hydrofoils 25, 26 are in contact with the body of water.

The leg-shaped surface-piercing hydrofoils 27, 28 that are arranged nearest to the bow 23 have respective free end portions having a tip that is directed facing away from the sky when the leg-shaped surface-piercing hydrofoils 27, 28 are in contact with the body of water.

As shown in FIGS. 1-4 regarding the first exemplary, non-limiting embodiment of the water scooping unit 7 and in FIGS. 5-8 regarding the second exemplary, non-limiting embodiment of the water scooping unit 7, the intake opening 20 is arranged facing the bow 22. In this way, water can be scooped via the intake opening 20 using the forward thrust of an aircraft to which the water scooping apparatus is attached.

As shown in FIGS. 1-4 regarding the first exemplary, non-limiting embodiment of the water scooping unit 7 and in FIGS. 5-8 regarding the second exemplary, non-limiting embodiment of the water scooping unit 7, the water scooping unit 7 is provided with an airfoil 24 that is arranged at a side of the water scooping unit 7 that faces away from the surface of the body of water when the water scooping apparatus is in the active state. The airfoil 24 is configured to have an angle of engagement with air that is chosen to create a downward force during descent of the water scooping unit 7 towards the surface of the body of water when the water scooping apparatus is in the active state.

As shown in FIGS. 1-4 regarding the first exemplary, non-limiting embodiment of the water scooping unit 7 and in FIGS. 5-8 regarding the second exemplary, non-limiting embodiment of the water scooping unit 7, the airfoil 24 is mounted near the stern of the water scooping unit 7. The airfoil 24 is configured and arranged to force the water scooping unit 7 to descend towards the surface of the body of water and stabilizes the water scooping unit 7 while being airborne.

Figure 9:
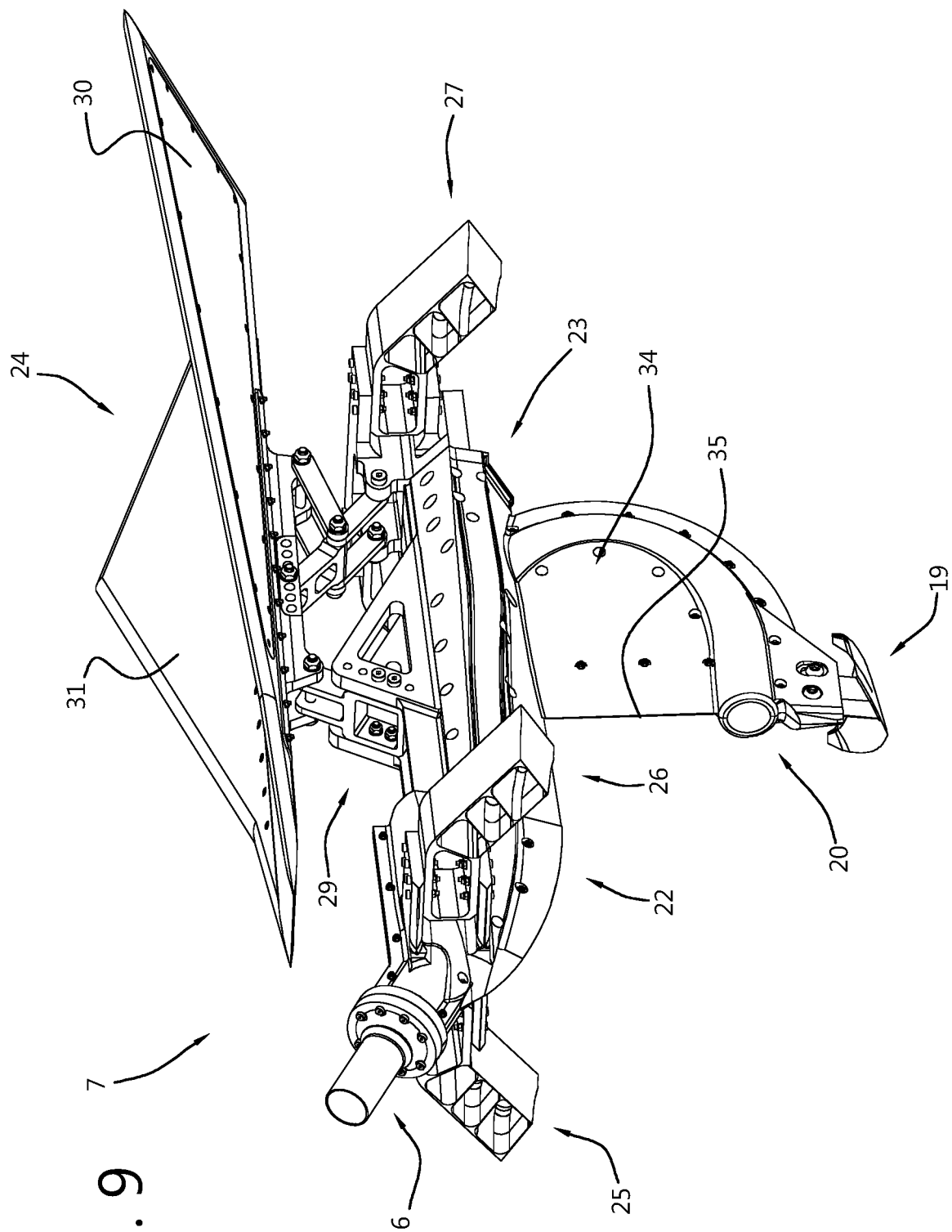
FIG. 9 shows a schematic isometric view of a third exemplary, non-limiting embodiment of a water scooping unit of a water scooping apparatus according to the invention.
Figure 10:
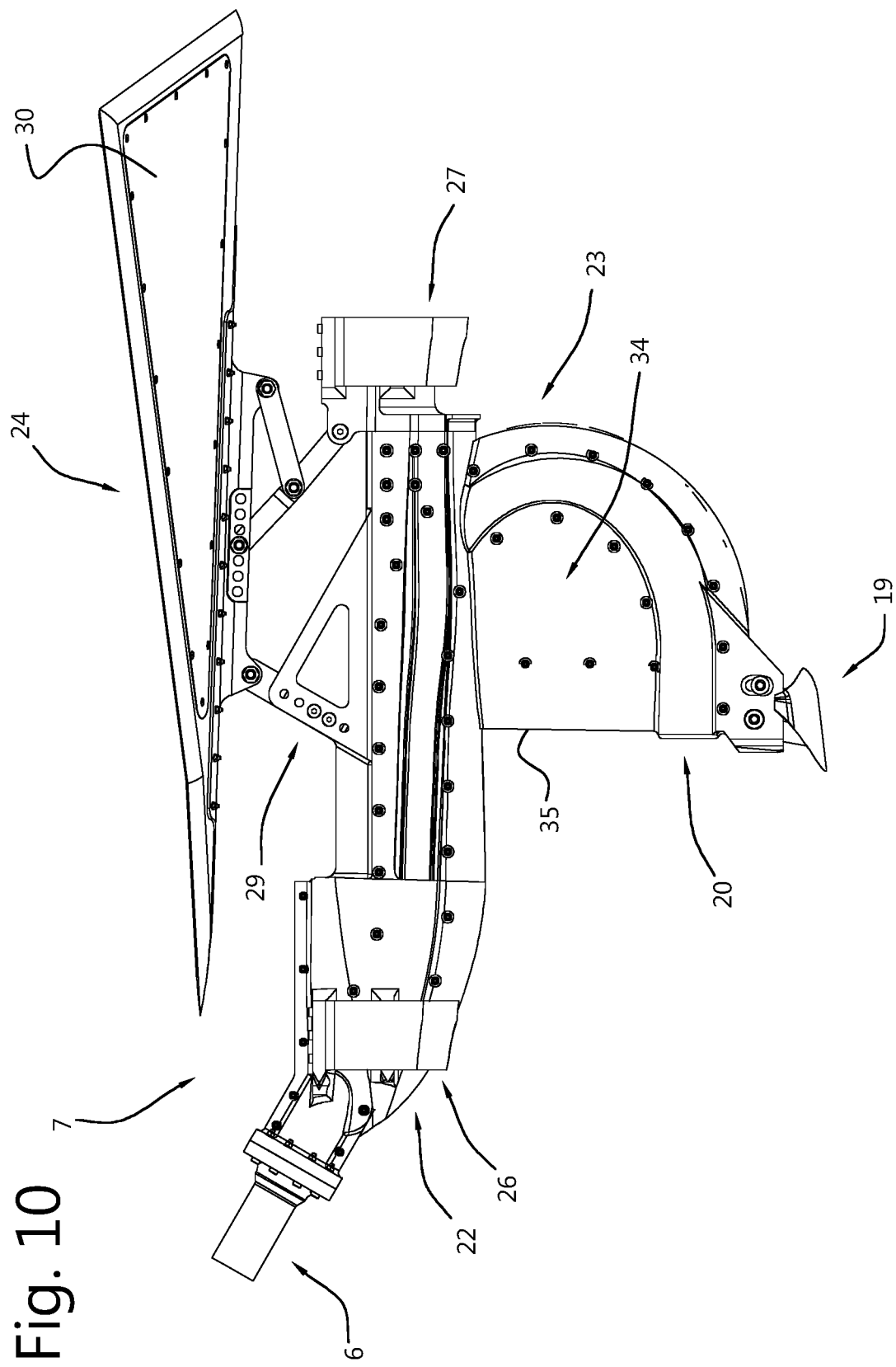
FIG. 10 shows a schematic side view of the third exemplary, non-limiting embodiment of the water scooping unit of the water scooping apparatus shown in FIG. 9.
Figure 11:
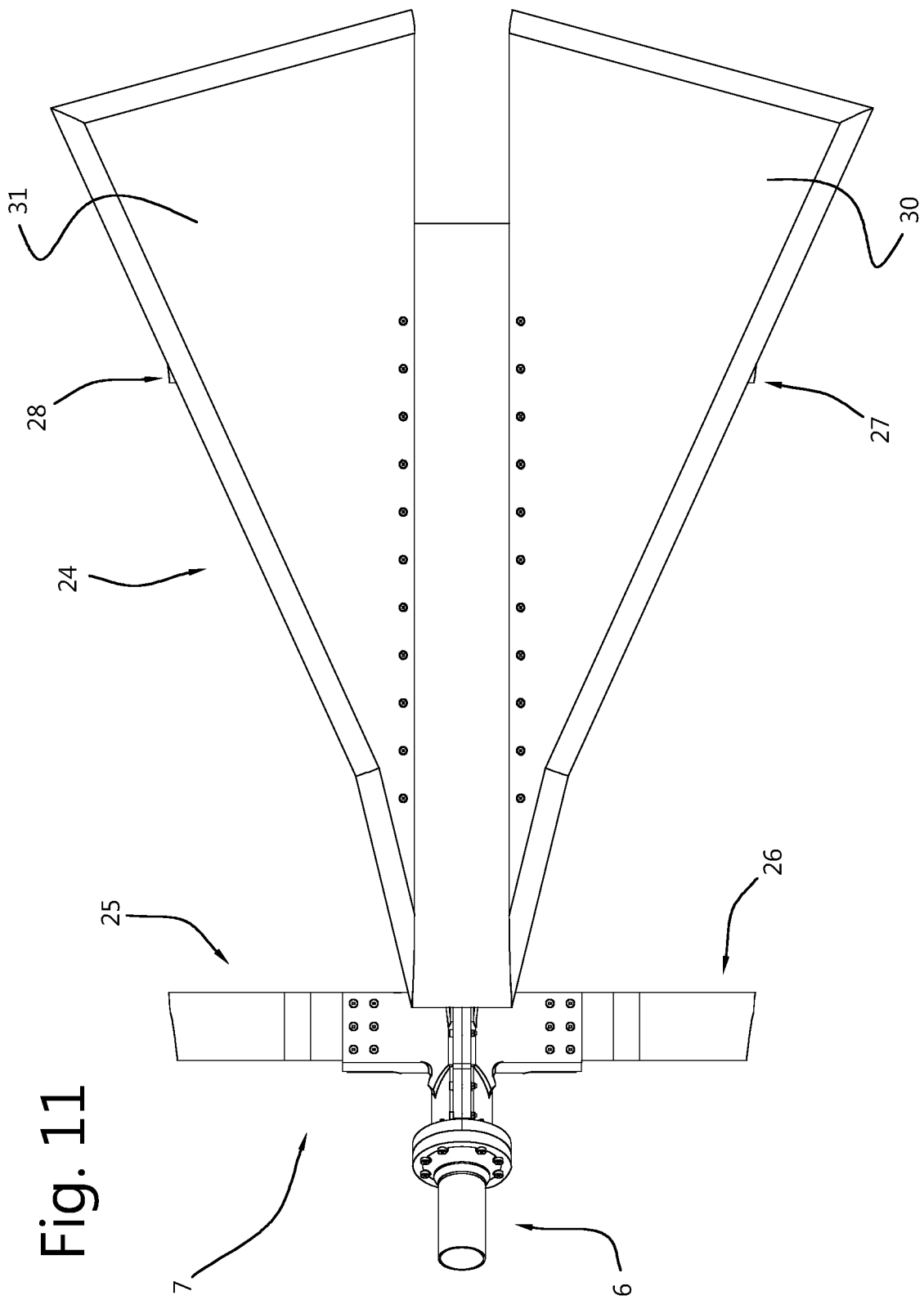
FIG. 11 shows a schematic top view of the third exemplary, non-limiting embodiment of the water scooping unit of the water scooping apparatus shown in FIGS. 9 and 10.

The airfoil 24 is collapsible towards the water scooping unit 7 via a collapsible support structure 29 that is associated with the water scooping unit 7. While the water scooping unit 7 is airborne above the surface of the body of water the airfoil 24 is deployed, whereas when the water scooping unit 7 is in contact with the body of water, the airfoil 24 is collapsed towards the water scooping unit 7 to prevent damage from for example waves that are present at the surface of the body of water. The airfoil 24 being in a collapsed position is schematically shown in FIGS. 9-11.

The collapsible support structure 29 shown in any one of the FIGS. 1-8 is configured to enable setting of the angle of engagement with air. This can be advantageous depending on the weather conditions.

The airfoil 24 schematically shown in any one of the FIGS. 1-8 comprises two wings 30, 31 that are associated with each other and arranged at an angle with respect to each other that is suitable to create said downward force during descent of the water scooping unit 7 towards the surface of the body of water while ensuring stabilization of the water scooping unit 7 while being airborne. After touch-down of the water scooping unit 7 on the body of water, the two wings 30, 31 of the airfoil 24 may be folded away, for example to the sides of the water scooping unit 7 or towards each other.

As shown in FIGS. 1-4 regarding the first exemplary, non-limiting embodiment of the water scooping unit 7 and in FIGS. 5-8 regarding the second exemplary, non-limiting embodiment of the water scooping unit 7, the water scooping unit 7 is provided with a hydrofoil 19 that is arranged at the side of the water scooping unit 7 that faces away from the sky when the water scooping apparatus is in the active state. The hydrofoil 19 is configured to have an angle of engagement with water that is chosen to create a downward force to allow the intake opening 20 to take in water when the water scooping apparatus is in the active state. In this way, the hydrofoil 19 ensures that the intake opening 20 stays fully submerged when the water scooping unit 7 is positioned with respect to the surface of the body of water by the surface-piercing hydrofoils 25, 26, 27, 28. As a result, the highest volume of water in the shortest period of time with the lowest forces on the aircraft can be taken in and transferred to at least one water tank associated with the aircraft.

The hydrofoil 19 is configured to enable setting of the angle of engagement with water. This can be advantageous depending on the weather conditions.

The hydrofoil 19 is arranged near the stern 23 of the water scooping unit 7. In this way, the hydrofoil 19 prevents the bow 22 of the water scooping unit 7 from diving below the surface of the body of water. Moreover, when the water scooping unit 7 is pulled through the water by the aircraft, the downward force resulting from the interaction between the hydrofoil 19 and the water pulls the water scooping unit 7 down into the water. This pulling down of the water scooping unit 7 is balanced by the upward force generated by the interaction between the surface-piercing hydrofoils 25, 26, 27, 28 and the water while the water scooping unit 7 is pulled through the water. By mounting the hydrofoil 19 near the stern 23 of the water scooping unit 7, the downward force may also compensate for a torque that results from the resistance between the intake opening 20 and the water through which the water scooping unit 7 is moved and that pushes the bow 22 of the water scooping unit 7 down. Therefore, an equilibrium position of the water scooping unit 7 with respect to the surface of the body of water can be reached in a passive way, i.e. as a result of the counteracting forces on the water scooping unit 7 of the water scooping apparatus a stable and safe scooping position of the water scooping unit 7 relative to the surface of the body of water can be obtained. Because of this equilibrium position of the water scooping unit 7 relative to the surface of the body of water, the water scooping unit 7 is prevented from moving too deep into the body of water, thereby mitigating the risk of the aircraft to be pulled down by the water scooping unit 7.

FIG. 4 most clearly shows that the intake opening 20 is provided in a V-shaped part 34 of the water scooping unit 7 that has a sharp-constructed section 35 that faces away from the stern 23 of the water scooping unit 7. The V-shaped part 34 of the water scooping unit 7 will split the water allowing the water scooping unit 7 to enter the water surface at high speed and the sharp-constructed section 35 of the V-shaped part 34 will split the water while the water scooping unit 7 is being pulled through the water by the aircraft in order not to cause too much pressure or stress on the aircraft. The sharp-constructed section 35 of the V-shaped part 34 of the water scooping unit 7 therefore acts like an axe.

The water scooping unit 7 can also be provided with so-called spray-spoilers that can be configured and arranged to deflect bow-waves and spray sideways in order to reduce the pressure or stress on the aircraft.

The stern 23 of the water scooping unit 7 is also configured to lead the water smoothly away from the water scooping unit 7 in order to cause less stress on the aircraft. The stern 23 can for example also be V-shaped both in a horizontal cross section as well as in a vertical cross section of the water scooping unit 7.

FIG. 4 most clearly shows that the surface-piercing hydrofoils of the first pair of surface-piercing hydrofoils 25, 26 are arranged at opposite sides of the intake opening 20 as seen in a direction transverse to the longitudinal centerline of the water scooping unit 7, and the surface-piercing hydrofoils of the second pair of surface-piercing hydrofoils 27, 28 are arranged at opposite sides of the intake opening 20 as seen in the direction transverse to the longitudinal centerline of the water scooping unit 7.

Furthermore, FIG. 4 shows that the surface-piercing hydrofoils of the first pair of surface-piercing hydrofoils 25, 26 are arranged to extend symmetrically with respect to the longitudinal centerline of the water scooping unit 7 as seen in the direction transverse to the longitudinal centerline of the water scooping unit 7, and the surface-piercing hydrofoils of the second pair of surface-piercing hydrofoils 27, 28 are arranged to extend symmetrically with respect to the longitudinal centerline of the water scooping unit 7 as seen in said direction transverse to the longitudinal centerline of the water scooping unit 7.

Figure 5:
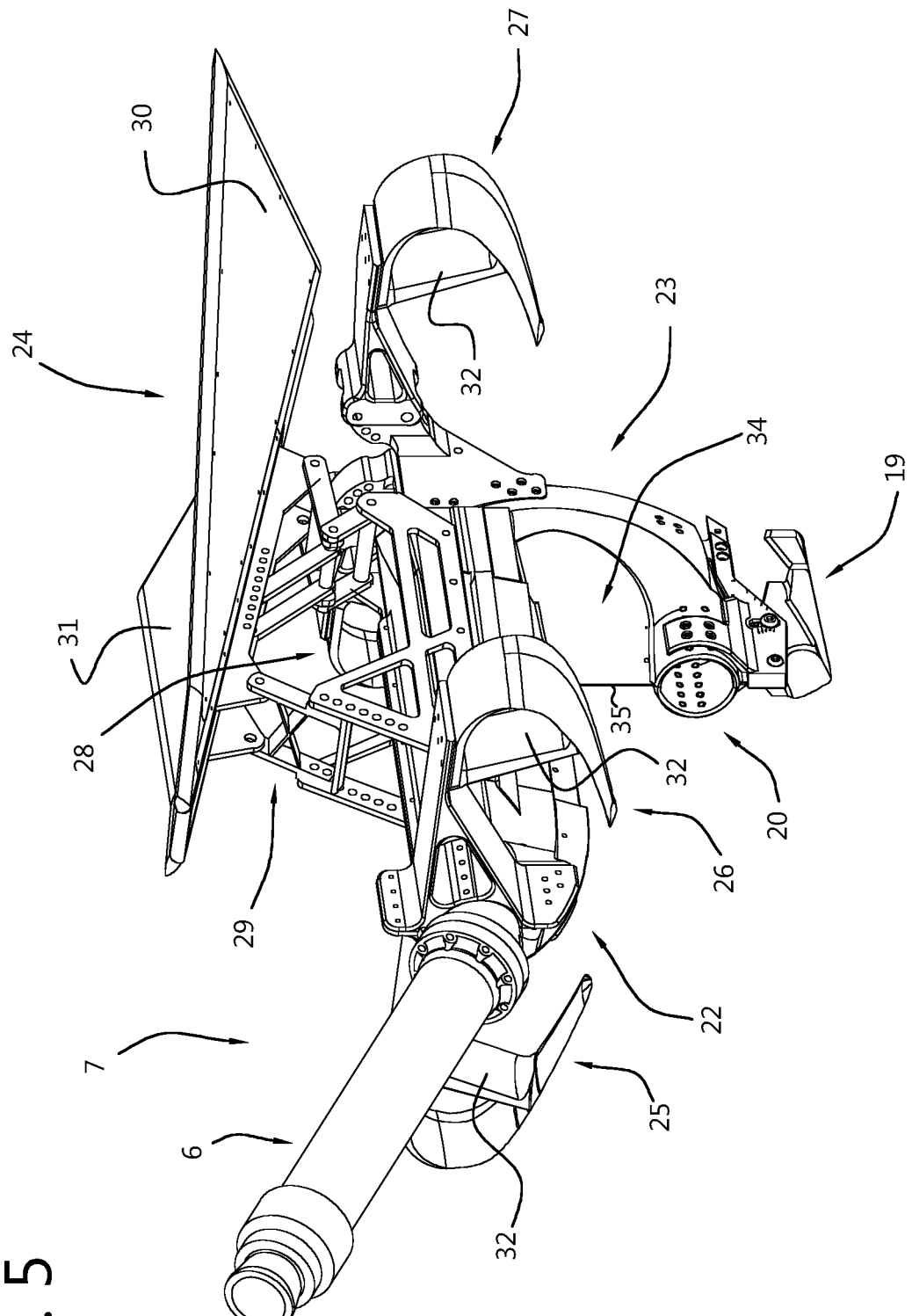
FIG. 5 shows a schematic isometric view of a second exemplary, non-limiting embodiment of a water scooping unit of a water scooping apparatus according to the invention.
Figure 6:
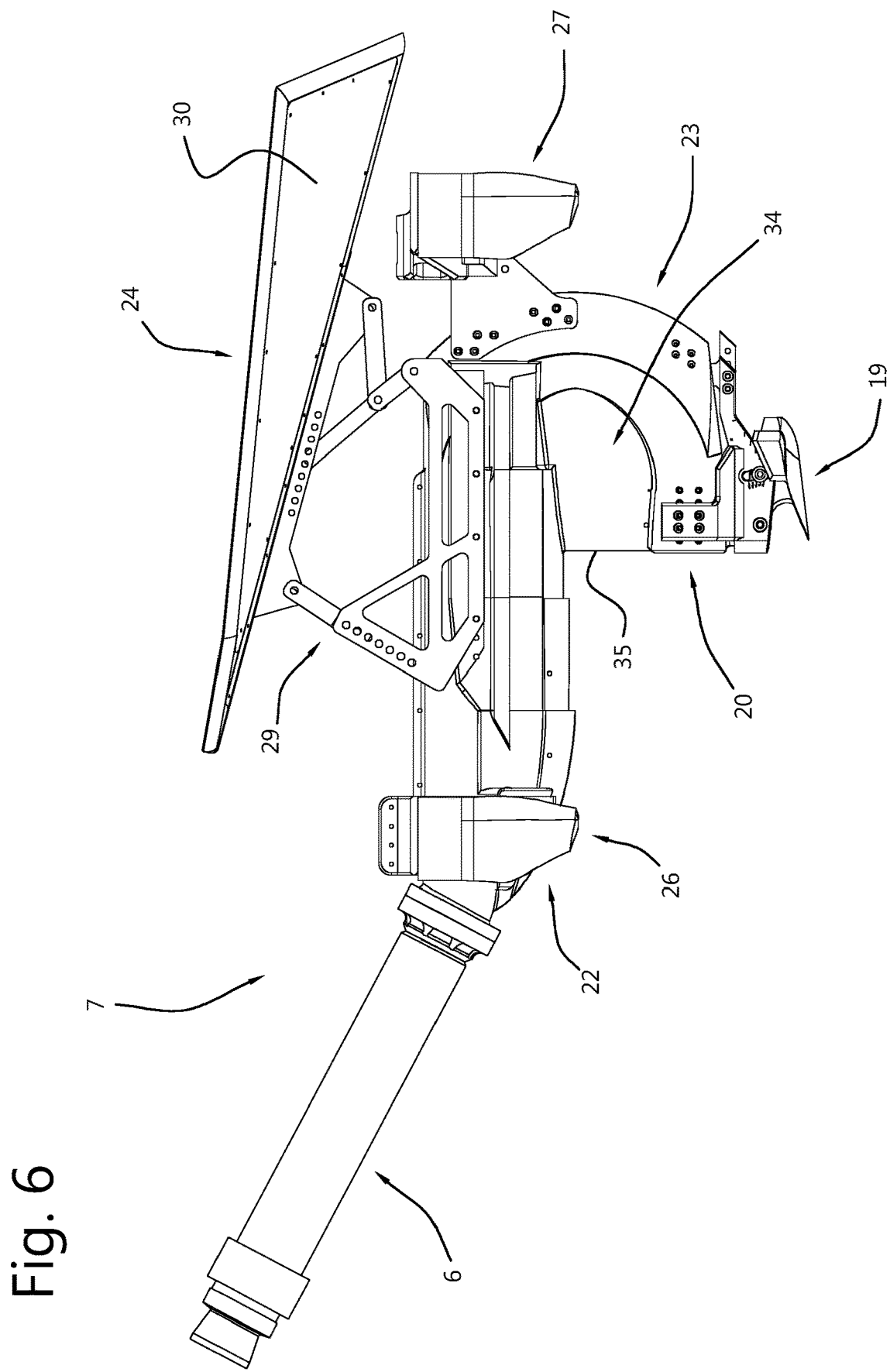
FIG. 6 shows a schematic side view of the second exemplary, non-limiting embodiment of the water scooping unit of the water scooping apparatus shown in FIG. 5.
Figure 7:
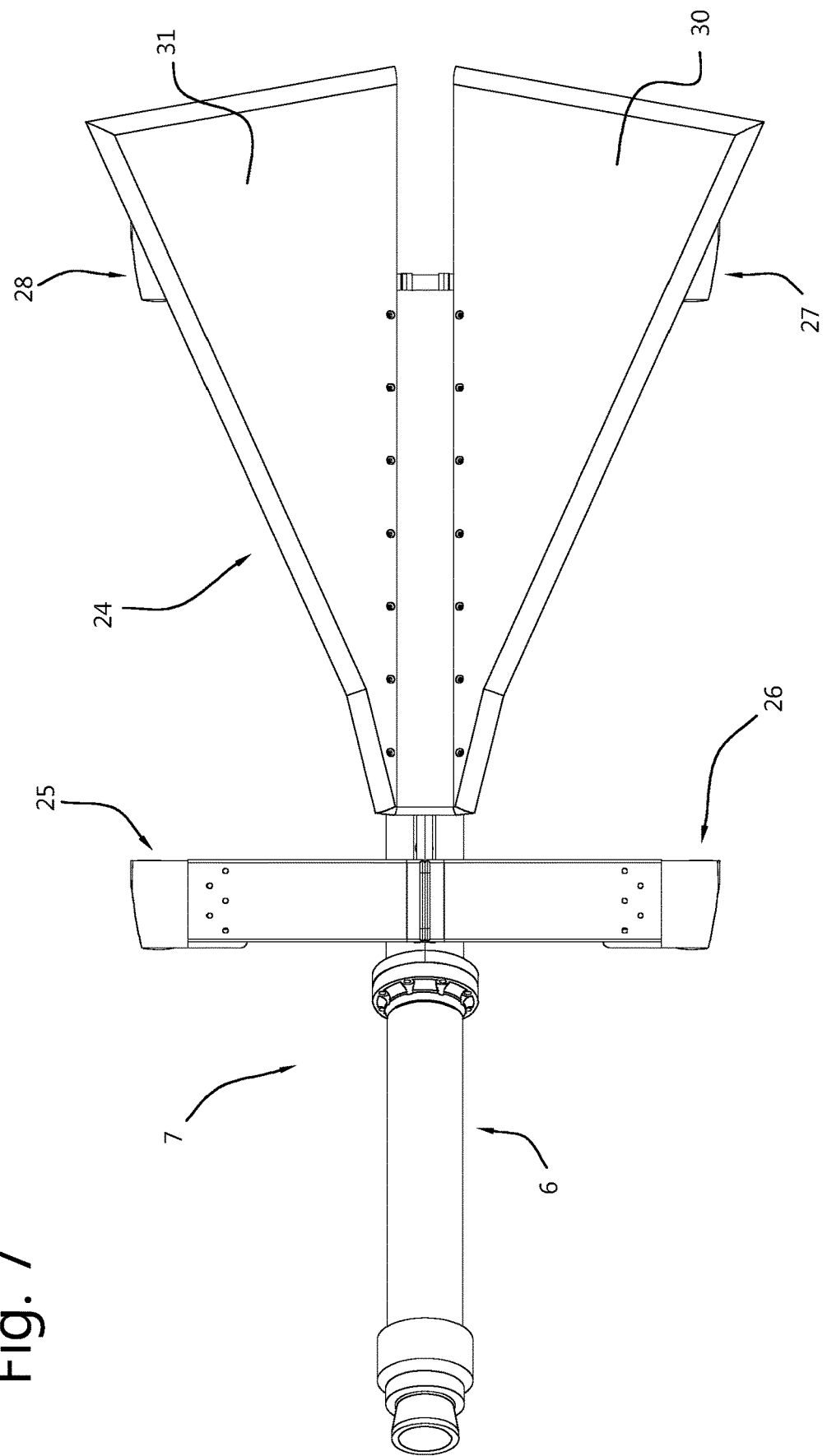
FIG. 7 shows a schematic top view of the second exemplary, non-limiting embodiment of the water scooping unit of the water scooping apparatus shown in FIGS. 5 and 6.
Figure 8:
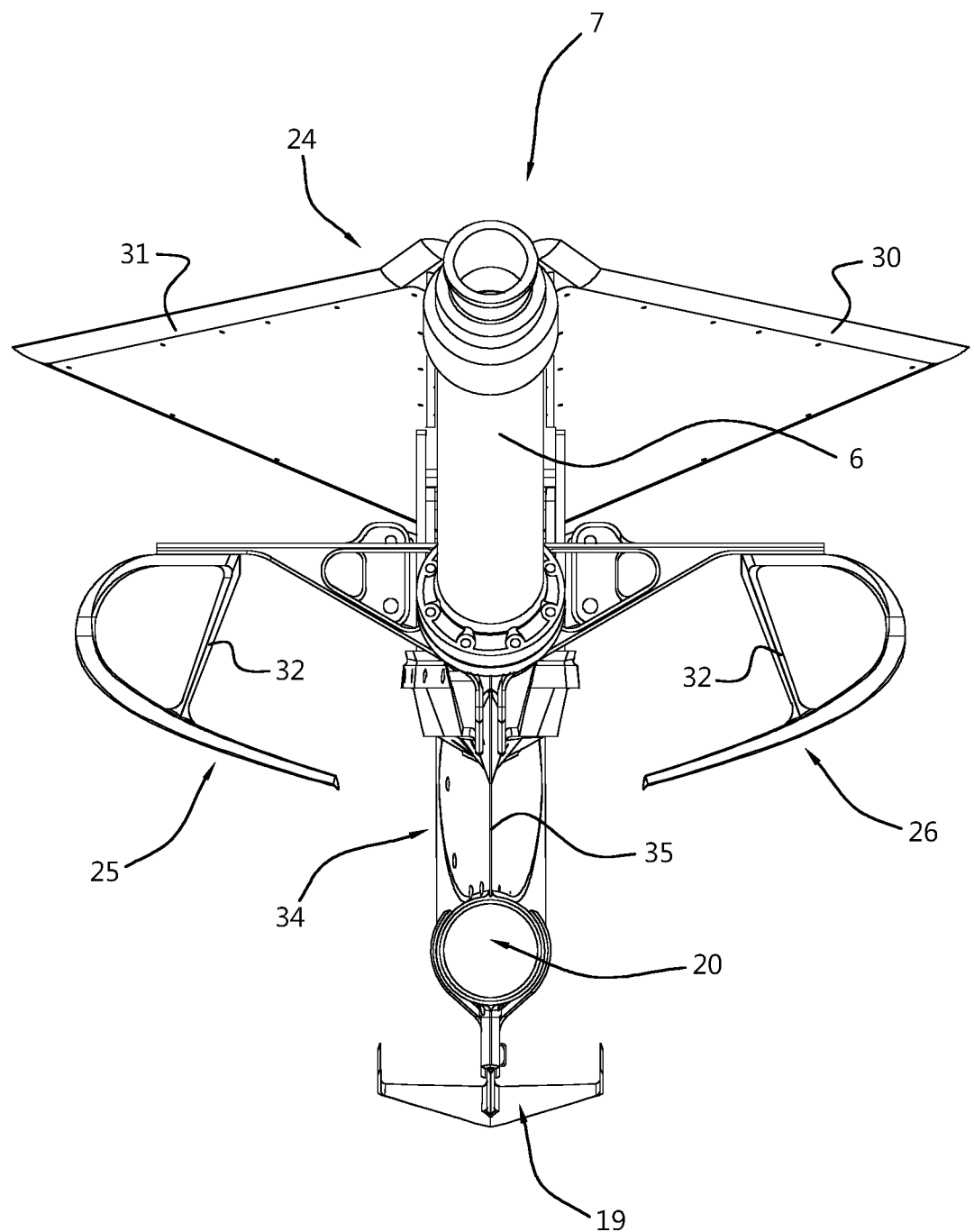
FIG. 8 shows a schematic front view of the second exemplary, non-limiting embodiment of the water scooping unit of the water scooping apparatus shown in FIGS. 5-7.

FIGS. 5-8 show different schematic views of a second exemplary, non-limiting embodiment of a water scooping unit 7 of a water scooping apparatus according to the invention. FIG. 5 shows a schematic isometric view of the second exemplary, non-limiting embodiment of the water scooping unit 7. FIG. 6 shows a schematic side view of the water scooping unit 7 shown in FIG. 5. FIG. 7 shows a schematic top view of the water scooping unit 7 shown in FIGS. 5 and 6. FIG. 8 shows a schematic front view of the water scooping unit 7 shown in FIGS. 5-7.

The four surface-piercing hydrofoils 25, 26, 27, 28 shown in FIGS. 5-8 are arc-shaped. Arc-shaped surface-piercing hydrofoils can advantageously be used in the event that modest to high waves are present at the surface of the body of water with which the water scooping unit 7 is in contact.

As shown in FIGS. 5-8, each of the arc-shaped surface-piercing hydrofoils 25, 26, 27, 28 comprises a reinforcement rib 32. Therefore, the arc-shaped surface-piercing hydrofoils 25, 26, 27, 28 shown in FIGS. 5-8 have a D-shaped cross-section. The reinforcement rib 32 of the D-shaped cross-section is facing away from the sky when the arc-shaped surface-piercing hydrofoil is in contact with the body of water.

The person skilled in the art will appreciate that the arc-shaped surface-piercing hydrofoils 25, 26, 27, 28 can be configured in any suitable way to improve the stability with which the water scooping unit 7 can be positioned relative to the surface of the body of water at which high waves are present.

FIGS. 1-8 show that the water scooping unit 7 is provided with an extension pipe 6 that can be connected with an extendible tubular member 5, for example a telescopic pipe or a hose 18 as is shown in for example FIGS. 9 and 10, respectively. The extension pipe 6 can have an outer diameter that fits inside the inner diameter of the extendible tubular member 5.

The intake opening 20 may have an intake-valve (not shown). Once the intake opening 20 of the water scooping unit 7 moves below the surface of the body of water, the water will pass through the intake opening 20 towards the extension pipe 6 under high pressure. The intake valve can be gradually opened to allow a controlled inflow of water once the intake opening 20 of the water scooping unit 7 has been submerged into the body of water.

FIG. 8 most clearly shows that the surface-piercing hydrofoils of the first pair of surface-piercing hydrofoils 25, 26 are arranged at opposite sides of the intake opening 20 as seen in a direction transverse to the longitudinal centerline of the water scooping unit 7, and the surface-piercing hydrofoils of the second pair of surface-piercing hydrofoils 27, 28 are arranged at opposite sides of the intake opening 20 as seen in the direction transverse to the longitudinal centerline of the water scooping unit 7.

Furthermore, FIG. 8 shows that the surface-piercing hydrofoils of the first pair of surface-piercing hydrofoils 25, 26 are arranged to extend symmetrically with respect to the longitudinal centerline of the water scooping unit 7 as seen in the direction transverse to the longitudinal centerline of the water scooping unit 7, and the surface-piercing hydrofoils of the second pair of surface-piercing hydrofoils 27, 28 are arranged to extend symmetrically with respect to the longitudinal centerline of the water scooping unit 7 as seen in said direction transverse to the longitudinal centerline of the water scooping unit 7.

Figure 12:
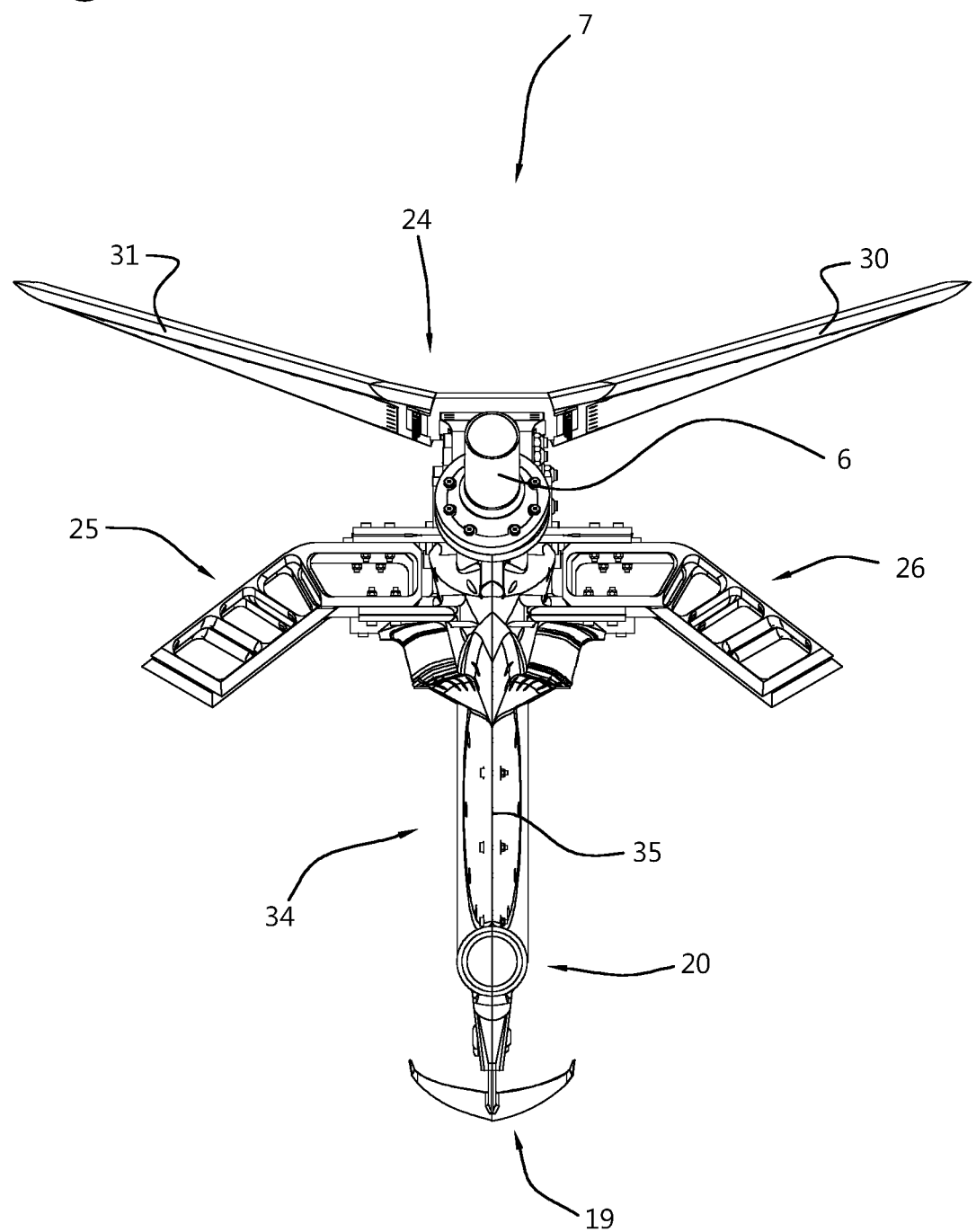
FIG. 12 shows a schematic front view of the third exemplary, non-limiting embodiment of the water scooping unit of the water scooping apparatus shown in FIGS. 9-11.

FIGS. 9-12 show different schematic views of a third exemplary, non-limiting embodiment of a water scooping unit 7 of a water scooping apparatus according to the invention. FIG. 9 shows a schematic isometric view of the third exemplary, non-limiting embodiment of the water scooping unit 7. FIG. 10 shows a schematic side view of the water scooping unit 7 shown in FIG. 9. FIG. 11 shows a schematic top view of the water scooping unit 7 shown in FIGS. 9 and 10. FIG. 12 shows a schematic front view of the water scooping unit 7 shown in FIGS. 9-11.

The four surface-piercing hydrofoils 25, 26, 27, 28 shown in FIGS. 9-12 are ladder-shaped. The ladder-shaped surface-piercing hydrofoils can advantageously be used in the event that modest to very high waves are present at the surface of the body of water. Under such medium to severe weather conditions, the ladder-shaped surface-piercing hydrofoils can achieve an even further improved stability with which the water scooping unit 7 of the water scooping apparatus 2 can be positioned relative to the surface 9 of the body of water when compared to the improved stability that can be achieved by using the arc-shaped surface-piercing hydrofoils shown in FIGS. 5-8. Moreover, the ladder-shaped surface-piercing hydrofoils shown in FIGS. 9-12 can still achieve stable positioning of the water scooping unit 7 of the water scooping apparatus 2 relative to the surface 9 of the body of water in such severe weather conditions in which the arc-shaped surface-piercing hydrofoils fail.

The person skilled in the art will appreciate that the ladder-shaped surface-piercing hydrofoils in accordance with the third exemplary embodiment shown in FIGS. 9-12 can be configured and arranged in any convenient and suitable way to achieve an improved stability with which the water scooping unit 7 of the water scooping apparatus 2 can be positioned relative to the surface 9 of the body of water at which the modest to high waves are present.

FIG. 12 most clearly shows that the surface-piercing hydrofoils of the first pair of surface-piercing hydrofoils 25, 26 are arranged at opposite sides of the intake opening 20 as seen in a direction transverse to the longitudinal centerline of the water scooping unit 7. The person skilled in the art will appreciate that also the surface-piercing hydrofoils of the second pair of surface-piercing hydrofoils 27, 28 are arranged at opposite sides of the intake opening 20 as seen in the direction transverse to the longitudinal centerline of the water scooping unit 7. This can be understood from FIGS. 9 and 11.

Furthermore, FIG. 12 shows that the surface-piercing hydrofoils of the first pair of surface-piercing hydrofoils 25, 26 are arranged to extend symmetrically with respect to the longitudinal centerline of the water scooping unit 7 as seen in the direction transverse to the longitudinal centerline of the water scooping unit 7. The person skilled in the art will appreciate that also the surface-piercing hydrofoils of the second pair of surface-piercing hydrofoils 27, 28 are arranged to extend symmetrically with respect to the longitudinal centerline of the water scooping unit 7 as seen in said direction transverse to the longitudinal centerline of the water scooping unit 7.

Figure 13:
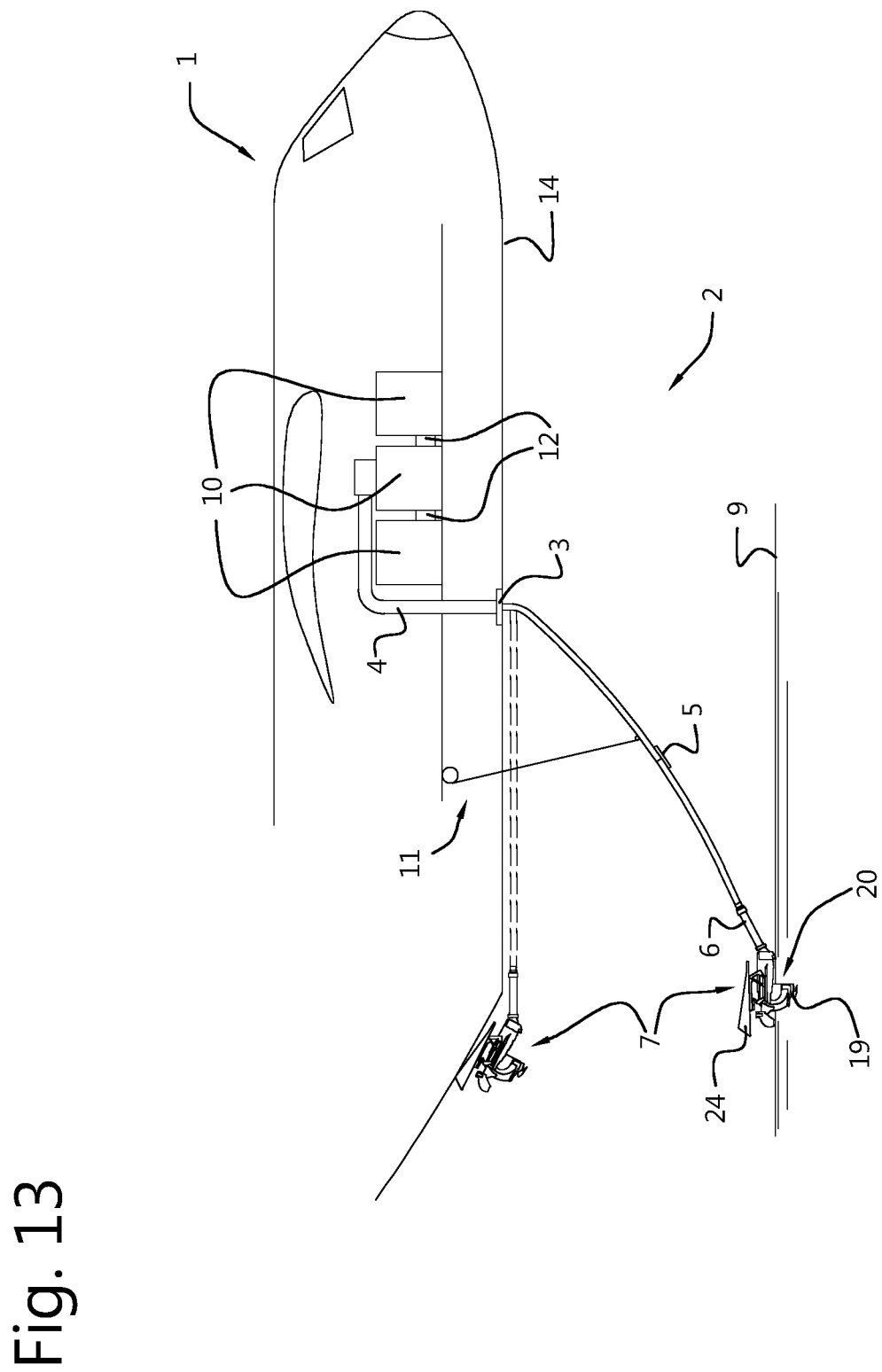
FIG. 13 shows a schematic view of a first exemplary, non-limiting embodiment of an aircraft according to the invention comprising a first exemplary, non-limiting embodiment of a water scooping apparatus according to the invention comprising telescopic pipes and a water scooping unit as shown in FIGS. 1-4 that is mounted underneath the aircraft when the water scooping apparatus is in an inactive state.

FIG. 13 shows a schematic view of a first exemplary, non-limiting embodiment of an aircraft 1 according to the invention comprising a first exemplary, non-limiting embodiment of a water scooping apparatus 2 according to the invention. The water scooping apparatus 2 comprises the water scooping unit 7 as shown in FIGS. 1-4. The intake opening 20 of the water scooping unit 7 is fluidically interconnected with three water tanks 10 that are arranged inside a fuselage 14 of the aircraft 1 via duct 4, extendible tubular member 5 and extension pipe 6. The person skilled in the art will appreciate that in accordance with an exemplary, non-limiting embodiment of the water scooping apparatus 2 according to the invention, three water tanks 10 are shown in FIG. 13. Depending on the specific requirements any number of water tanks 10 can be envisaged.

The water tanks 10 can contain for example 10.000 to 30.000 liters of liquid fire suppressant, typically water or water to which fire suppressant additives have been added. The three water tanks 10 shown in FIG. 13 are interconnected via connection ducts 12 that typically have a diameter that is wide enough to enable high-speed filling of the water tanks 10 and maintain a steady balance of the aircraft 1 during high-speed filling of the water tanks 10. An airtanker is able to drop the content of the water tanks 10 in a very short time, varying from 4 to 8 seconds, on a forest fire or wild fire.

The extendible tubular member 5 shown in FIG. 13 is a telescopic pipe that is connected to the fuselage 14 of the aircraft 1 via a pivotal connection 3, for example a hinge. The pivotal connection 3 can be attached to a frame that is mounted in the aircraft 1. The pivotal connection 3 can also directly be mounted inside the aircraft 1 and connected with a main frame or fuselage 14 of the aircraft 1 that has been reinforced for this purpose. The person skilled in the art will appreciate that the extendible tubular member 5 can also be pivotally attached to the extension pipe 6. In this way the water scooping unit 7 is allowed to freely move with respect to the extendible tubular member 5.

The extendible tubular member 5 enables the water scooping apparatus 2 to be operable in either an inactive state or in an active state.

The inactive state is to be construed as the state in which the extendible tubular member 5 is in a retracted state either inside or underneath the aircraft 1 that is provided with the water scooping apparatus 2. Moreover, in the inactive state, the water scooping unit 7 of the water scooping apparatus 2 is in a resting position in which the water scooping unit 7 is not in contact with the body of water.

The active state is to be construed as the state in which the extendible tubular member 5 is in an extended state and at an angle with respect to a longitudinal central axis of a fuselage 14 of the aircraft 1. In the active state, the water scooping unit 7 of the water scooping apparatus 2 is either descending towards the surface 9 of the body of water or moving through the body of water to scoop water via the intake opening 20.

As shown in FIG. 13, the water scooping unit 7 is arranged underneath the aircraft 1 in a resting position when the water scooping apparatus 2 is in the inactive state. The aircraft 1 can be an airtanker, e.g. a conventional non-amphibious aircraft.

When the water scooping apparatus 2 is in the active state, the extendible tubular member 5 extends downwards from the aircraft 1 at an angle and allows the water scooping unit 7 to descend towards the surface 9 of a body of water and to eventually come into contact with the body of water as is also shown in FIG. 9. The pivoting action required to extend the extendible tubular member 5 is enabled by the pivotal connection 3 via which the extendible tubular member 5 is attached to the aircraft 1. It is noted that the term 'at an angle' is to be understood so as to mean that the extendible tubular member 5 is oblique with respect to the longitudinal central axis of the fuselage 14 of the aircraft 1. The angle between the extendible tubular member 5 and the longitudinal central axis of the fuselage 14 is preferably 20 to 70 degrees, more preferably 40 to 45 degrees.

The pivotal connection 3 furthermore enables the aircraft 1 to fly at variable altitudes relative to the surface 9 of the body of water. The pivotability of the extendible tubular member 5 with respect to the aircraft 1 allows an optimal angle to be assumed between the extendible tubular member 5 and the aircraft 1 for pulling the water scooping unit 7 through the body of water when the aircraft 1 flies at a given altitude above the surface 9 of the body of water. For example, a body of water having high waves may require the aircraft to fly at a higher altitude than in the case of a body of water having low waves. A conventional non-amphibious aircraft 1 provided with the water scooping apparatus 2 according to the present invention can scoop water from a suitable body of water when flying at an altitude between 1-18 meters above the surface 9 of the body of water, preferably at an altitude between 5-15 meters above the surface 9 of the body of water, while the water scooping unit 7 remains in contact with the body of water in such a way that the intake opening 20 can intake water from the body of water.

FIG. 13 furthermore shows positioning means 11 that are configured and arranged to position the extendible tubular member 5 to allow the water scooping unit 7 to move in and out of a resting position when the water scooping apparatus 2 is switched between the inactive state and the active state. When the water scooping apparatus 2 is switched between to the inactive state and the active state, the positioning means 11 position the extendible tubular member 5 in such a way to prevent the water scooping unit 7 from colliding with the fuselage 14 of the aircraft 1 when it is moved in and out of the resting position. In this way, the positioning means 11 enables the so-called launch and capture of the water scooping unit 7 when the water scooping apparatus 2 is switched between the inactive state and the active state. Moreover, the positioning means 11 allows the extendible tubular member 5 to be manufactured from relatively light material wherein the mechanical force to position the extendible tubular member 5 and the water scooping unit 7 by lifting them is relieved by means of the positioning means 11. The person skilled in the art will appreciate that the positioning means can be any suitable arrangement that enables launch and capture of the water scoping unit 7 without colliding with the fuselage 14 of the aircraft 1.

Figure 14:
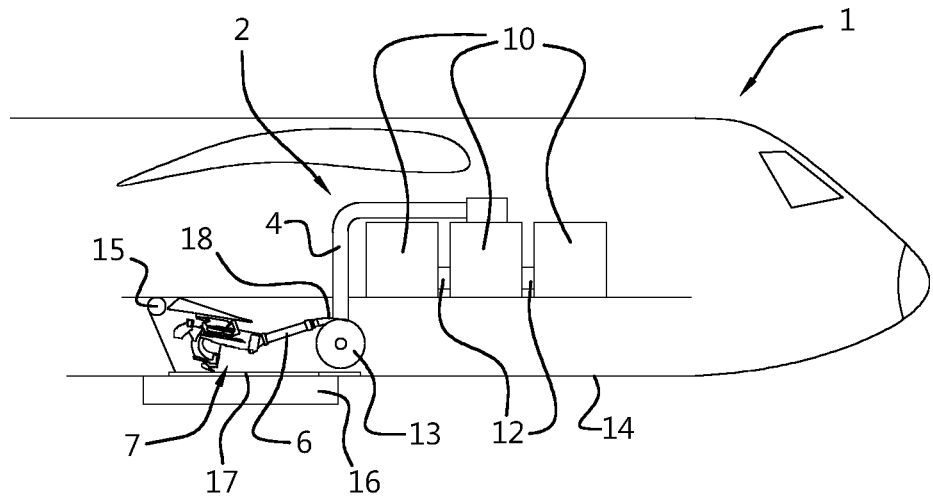
FIG. 14 shows a schematic view of a second exemplary, non-limiting embodiment of an aircraft according to the invention comprising a second exemplary, non-limiting embodiment of a water scooping apparatus according to the invention comprising a hose on a reel and a water scooping unit as shown in FIGS. 1-4 that is mounted inside the aircraft when the water scooping apparatus is in an inactive state.

FIG. 14 shows a schematic view of a second exemplary, non-limiting embodiment of an aircraft 1 according to the invention comprising a second exemplary, non-limiting embodiment of a water scooping apparatus 2 according to the invention comprising a hose 18 on a reel 13 and a water scooping unit 7 as shown in FIGS. 1-4 that is mounted inside the aircraft 1 when the water scooping apparatus 2 is in the inactive state. The reel 13 is an exemplary, non-limiting embodiment of a means for releasing and retracting the hose 18. By releasing the hose 18 to roll off from the reel 13 the hose 18 can extend from the aircraft 1 to allow the water scooping unit 7 to descend towards the surface 9 of the body of water and to come into contact with the body of water. By retracting the hose 18 to roll onto the reel 13, the hose 18 can be retracted after use and allows the water scooping unit 7 to be returned to its resting position inside the aircraft 1. At least one of the rolling onto the reel 13, the unrolling from the reel 13 of the hose 18 and the flexibility of the hose 18 provides the hinge action allowing the hose 18 to extend from the aircraft 1 and assume an angle relative to the aircraft 1. Moreover, the main axle of the reel 13 can freely rotate and allow the aircraft 1 to fly at different altitudes, preferably between 5 and 15 meters, above the surface 9 of the body of water from which the water is scooped.

By rolling up the hose 18 onto the reel 13 provides a space saving solution for storing the water scooping unit 7 of the water scooping apparatus. As shown in FIG. 14, the water scooping unit 7 and the reel 13 with the hose 18 are accommodated inside the aircraft's fuselage 14 in a compartment underneath for example a loading floor. The compartment can be covered with a door or hatch 16. The water scooping unit 7 is positioned on a slide 17 from which the water scooping unit 7 can slide off to begin its descent towards the surface 9 of the body of water.

The person skilled in the art will appreciate that the resting position of the water scooping unit 7 can also be underneath the aircraft 1, i.e. outside of the fuselage 14. The type of extendible tubular member, i.e. for example a pipe, a telescopic pipe or a hose, does not pose any restrictions on the location of the resting position of the water scooping unit 7. However, when the water scooping apparatus 2 is arranged completely inside the aircraft's fuselage 14 when the water scooping apparatus 2 is not in use, the aircraft 1 can fly without additional air resistance due to parts of the water scooping apparatus 2 extending outside the fuselage 14.

Figure 15:
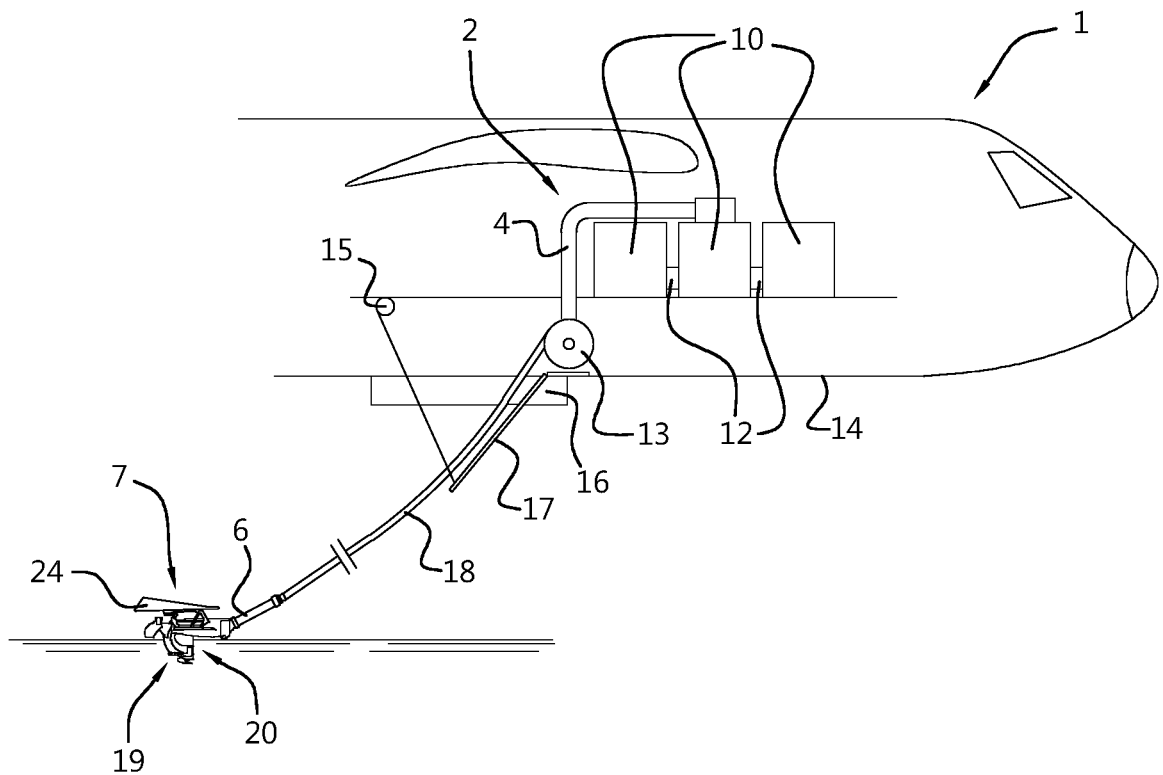
FIG. 15 shows a schematic view of the aircraft shown in FIG. 14 wherein the water scooping apparatus is in an active state.

FIG. 15 shows a schematic view of the aircraft 1 shown in FIG. 14 wherein the water scooping apparatus 2 is in the active state. The door or hatch 16 in the fuselage 14 is open and the slide 17 from which the water scooping unit 7 has slid off to begin its descent towards the surface 9 of the body of water from which the water is to be scooped is kept in position using a winch 15 with a cable that is attached to a free side of the slide 17. The slide 17 can be lowered by rolling the cable off from the winch 15 and raised by rolling the cable onto the winch 15.

The scooping capacity of the water scooping apparatus 2 is determined among others by the diameter of the hose 18, the surplus-power of the engines of the aircraft 1 and the loading-capacity of the aircraft 1. An overflow valve (not shown) can be installed in the water tanks 10 to avoid overloading. After filling the water tanks 10 the overflow valve can be closed, the hose 18 rolled onto the reel 13 and the water scooping unit 7 can resume its resting position on the slide 17 and the door or hatch 16 can be closed. If higher volumes of water need to be scooped in the same amount of time, the water scooping apparatus 2 can comprise two or more hoses 18 that are arranged in parallel instead of the one hose 18 that is shown by way of example only in FIGS. 10 and 11.

The hose 18, or multiple hoses 18, can be accompanied by one or more cables (not shown) for lifting or hoisting the water scooping unit 7 from its resting position to its operating position and vice versa. The one or more cables also allow relieving the hose 18 from the tensile force exerted by the aircraft 1 to the water scooping unit 7 in its operating position.

The hose 18 is pivotally attached to the water scooping unit 7 and on the other end the main axle/tube of the reel can freely rotate, which allows the aircraft 1 to fly at an altitude between 1-18 meters, preferably 5-15 meters above the surface 9 of the body of water from which the water is to be scooped. In this way the water scooping unit 7 remains in perfect scooping position when the water scooping apparatus 2 is in the active state. The diameters of the hose 18 and the duct 4 to the water tanks 10 is chosen to allow high-speed filling of the water tanks 10 and the wide-dimensional ducts 12 fluidly interconnecting the water tanks 10 ensure equal filling of the water tanks 10 and consequently balance and stability of the aircraft 1 during the process. The embodiments described above are given by way of example only. Variations are possible without departing from the scope of protection provided by the appended claims.

The present invention can be summarized as relating to a water scooping apparatus 2 for an aircraft 1, comprising a water scooping unit 7 that is associated with a water tank 10 via an extendible tubular member 5, 18, the water scooping unit being provided with an intake opening 20 that is in fluidic communication with the extendible tubular member 5, 18 and arranged at a side of the water scooping unit 7 facing away from the sky when the water scooping apparatus 2 is in an active state, the water scooping unit 7 being provided with a plurality of surface-piercing hydrofoils 25, 26, 27, 28 arranged surrounding the intake opening 20 and configured to generate an upward force when being moved through a body of water when the water scooping apparatus 2 is in the active state to position the water scooping unit 7 with respect to the body of water in such a way to ensure water intake via the intake opening 20.

The invention also relates to an aircraft 1 comprising said water scooping apparatus 2 and to a method for filling at least one water tank 10 of an aircraft 1 comprising said water scooping apparatus 2.

It will be clear to a person skilled in the art that the scope of the present invention is not limited to the examples discussed in the foregoing but that several amendments and modifications thereof are possible without deviating from the scope of the present invention as defined by the attached claims. In particular, combinations of specific features of various aspects of the invention may be made. An aspect of the invention may be further advantageously enhanced by adding a feature that was described in relation to another aspect of the invention. While the present invention has been illustrated and described in detail in the figures and the description, such illustration and description are to be considered illustrative or exemplary only, and not restrictive.

The present invention is not limited to the disclosed embodiments. Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference numerals in the claims should not be construed as limiting the scope of the present invention.

REFERENCE NUMERALS 1 aircraft
2 water scooping apparatus
3 pivotal connection
4 duct
5 extendible tubular member
6 extension pipe
7 water scooping unit of the water scooping apparatus
9 surface of a body of water
10 water tank
11 positioning means
12 connection duct
13 reel
14 fuselage
15 winch
16 hatch
17 slide
18 hose
19 hydrofoil
20 intake opening
21 spray spoiler
22 axe bow
23 stern
24 airfoil
25 surface-piercing hydrofoil
26 surface-piercing hydrofoil
27 surface-piercing hydrofoil
28 surface-piercing hydrofoil
29 collapsible support structure
30 first wing of airfoil
31 second wing of airfoil
32 reinforcement rib
33 foot section of leg-shaped hydrofoil
34 V-shaped part of water scooping unit
35 sharp-constructed section of the V-shaped part of the water scooping unit

The invention claimed is:

1. A water scooping apparatus for an aircraft, comprising:
an extendible tubular member having a first end and an opposite end, wherein the first end is pivotally attachable to the aircraft, the extendible tubular member being at least partially retracted when the water scooping device is in an inactive state and extending downwards from the aircraft at an angle when the water scooping device is in an active state;
a duct for fluidly connecting a water tank of the aircraft to the first end of the extendible tubular member;
a water scooping unit that is fluidly connected to the opposite end of the extendible tubular member, the water scooping unit being provided with an intake opening that is in fluidic communication with the extendible tubular member and that is arranged at a side of the water scooping unit that faces away from a sky when the water scooping apparatus is in the active state, the water scooping unit being provided with a plurality of surface-piercing hydrofoils, characterized in that the surface-piercing hydrofoils of said plurality of surface-piercing hydrofoils being arranged surrounding the intake opening in such a way that as seen in a direction parallel to a longitudinal centerline of the water scooping unit a first pair of surface-piercing hydrofoils is arranged upstream of the intake opening and a second pair of surface-piercing hydrofoils is arranged downstream of the intake opening, the surface-piercing hydrofoils of each of the first pair of surface-piercing hydrofoils and the second pair of surface-piercing hydrofoils being configured for generating an upward force when being moved through a body of water when the water scooping apparatus is in the active state that positions the water scooping unit with respect to a surface of the body of water in such a way that ensures water intake via the intake opening.

2. The water scooping apparatus according to claim 1, wherein the extendible tubular member comprises at least one hose, and wherein the water scooping apparatus further comprises means for releasing and retracting the at least one hose.

3. The water scooping apparatus according to claim 2, wherein the means for releasing and retracting of the at least one hose comprises a reel that is configured and arranged for rolling and unrolling the at least one hose.

4. The water scooping apparatus according to claim 3, comprising positioning means that are configured and arranged for positioning the extendible tubular member and allow movement of the water scooping unit in and out of a resting position when the water scooping apparatus is switched between the inactive state and the active state.

5. The water scooping apparatus according to claim 1, wherein the water scooping unit comprises a bow and a stern.

6. The water scooping apparatus according to claim 5, wherein the intake opening is arranged facing the bow.

7. The water scooping apparatus according to claim 5, wherein the intake opening is provided with an intake valve.

8. The water scooping apparatus according to claim 1, wherein the water scooping unit is provided with a hydrofoil that is arranged at the side of the water scooping unit that faces away from the sky when the water scooping apparatus is in the active state, the hydrofoil having an angle of engagement with water that creates a downward force and allows water intake when the water scooping apparatus is in the active state.

9. The water scooping apparatus according to claim 8, wherein the hydrofoil is arranged near the stern.

10. The water scooping apparatus according to claim 1, wherein the extendible tubular member comprises an extendible pipe having at least one extension pipe.

11. The water scooping apparatus according to claim 10, wherein the extendible pipe is a telescopic pipe.

12. The water scooping apparatus according to claim 1, wherein the surface-piercing hydrofoils of said first pair of surface-piercing hydrofoils are arranged at opposite sides of the intake opening as seen in a direction transverse to the longitudinal centerline of the water scooping unit, and the surface-piercing hydrofoils of said second pair of surface-piercing hydrofoils are arranged at opposite sides of the intake opening as seen in said direction transverse to the longitudinal centerline of the water scooping unit.

13. The water scooping apparatus according to claim 12, wherein the surface-piercing hydrofoils of said first pair of surface-piercing hydrofoils extend symmetrically with respect to the longitudinal centerline of the water scooping unit as seen in said direction transverse to the longitudinal centerline of the water scooping unit, and the surface-piercing hydrofoils of said second pair of surface-piercing hydrofoils extend symmetrically with respect to the longitudinal centerline of the water scooping unit as seen in said direction transverse to the longitudinal centerline of the water scooping unit.

14. An aircraft comprising a fuselage that is provided with the water tank, wherein the aircraft is further provided with a water scooping apparatus according to claim 1, the water scooping apparatus being pivotally associated with the aircraft, wherein the water scooping apparatus is in fluid communication with the water tank via the duct.

15. A method of operating the aircraft according to claim 14, the method comprising:
flying over a surface of a body of water at an altitude in a range of 1-18 meter;
extending the extendible tubular member until the water scooping unit of the water scooping apparatus is brought into contact with the surface of the body of water; and
taking in water from the body of water via the intake opening of the water scooping unit.

16. The water scooping apparatus according to claim 1, wherein the plurality of surface-piercing hydrofoils comprises at least one of surface-piercing hydrofoils having a leg-shape, surface-piercing hydrofoils having an arc-shape, and surface-piercing hydrofoils having a ladder-shape.

17. The water scooping apparatus according to claim 1, wherein the water scooping unit is provided with an airfoil that is arranged at a side of the water scooping unit that faces away from the surface of the body of water when the water scooping apparatus is in the active state, the airfoil being configured such that the airfoil has an angle of engagement creating a downward force during descent of the water scooping unit towards the surface of the body of water when the water scooping apparatus is in the active state.

* * * * *